(12) United States Patent
Wuppermann

(10) Patent No.: US 8,406,337 B2
(45) Date of Patent: Mar. 26, 2013

(54) METHOD AND APPARATUS FOR SENDING DC-BALANCED SIGNALS OVER A TRANSMISSION LINE

(75) Inventor: Bernd Wuppermann, Pacifica, CA (US)

(73) Assignee: Agilent Technologies, Inc., Santa Clara, CA (US)

( * ) Notice: Subject to any disclaimer, the term of this patent is extended or adjusted under 35 U.S.C. 154(b) by 1309 days.

(21) Appl. No.: 11/831,593

(22) Filed: Jul. 31, 2007

(65) Prior Publication Data

US 2009/0034648 A1 Feb. 5, 2009

(51) Int. Cl.
*H04L 25/34* (2006.01)
(52) U.S. Cl. ........................................................ 375/288
(58) Field of Classification Search .................. 375/286, 375/288, 257, 259, 295
See application file for complete search history.

(56) References Cited

U.S. PATENT DOCUMENTS

| | | | | |
|---|---|---|---|---|
| 5,448,231 A | * | 9/1995 | Takezoe et al. | 340/870.39 |
| 2004/0218621 A1 | * | 11/2004 | Dove | 370/445 |
| 2006/0215769 A1 | * | 9/2006 | Haridass et al. | 375/257 |
| 2007/0149152 A1 | * | 6/2007 | Hsiao et al. | 455/127.2 |

* cited by examiner

*Primary Examiner* — Kevin M Burd

(57) ABSTRACT

A DC-balanced signal is imposed on the input of a transmission line. Prior to imposing the DC-balanced signal, the input of the transmission line is held at an intermediate DC level that intermediate between the maximum and minimum DC levels of the DC-balanced signal. Alternatively, a compensating pulse is additionally imposed on the input of the transmission line. The compensating pulse compensates for a change in the DC level at the output of the transmission line caused by the imposing of the DC-balanced signal on the input of the transmission line.

14 Claims, 8 Drawing Sheets

IMPOSE DC-BALANCED SIGNAL ON INPUT OF TRANSMISSION LINE. DC-BALANCED SIGNAL HAS A HIGH STATE AND A LOW STATE EACH HAVING A RESPECTIVE DC LEVEL (102)

100

PRIOR TO IMPOSING DC-BALANCED SIGNAL ON INPUT OF TRANSMISSION LINE, HOLD INPUT OF TRANSMISSION LINE AT INTERMEDIATE DC LEVEL INTERMEDATE BETWEEN DC LEVELS OF HIGH STATE AND LOW STATE OF DC-BALANCED SIGNAL (104)

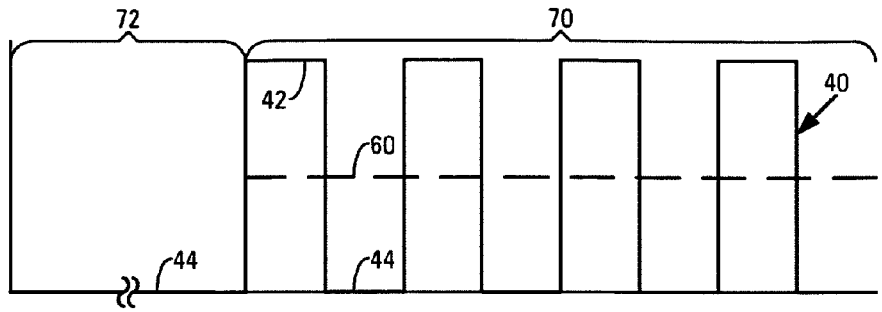
FIG. 2D
PRIOR ART
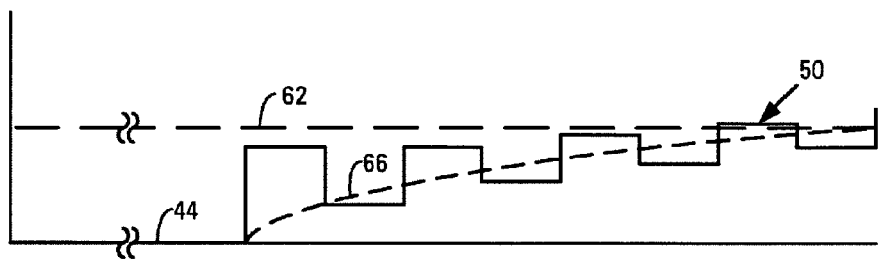
FIG. 2E
PRIOR ART
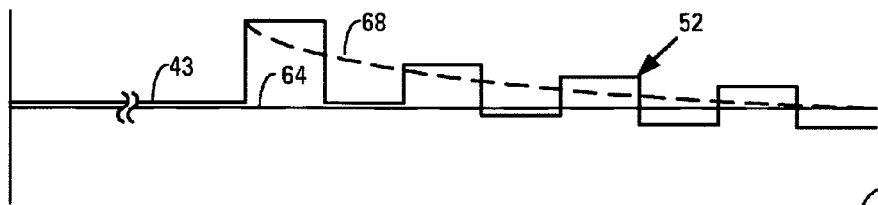
FIG. 2F
PRIOR ART
FIG. 4A
| IMPOSE DC-BALANCED SIGNAL ON INPUT OF TRANSMISSION LINE. DC-BALANCED SIGNAL HAS A HIGH STATE AND A LOW STATE EACH HAVING A RESPECTIVE DC LEVEL (102) |
↓  100
| PRIOR TO IMPOSING DC-BALANCED SIGNAL ON INPUT OF TRANSMISSION LINE, HOLD INPUT OF TRANSMISSION LINE AT INTERMEDIATE DC LEVEL INTERMEDIATE BETWEEN DC LEVELS OF HIGH STATE AND LOW STATE OF DC-BALANCED SIGNAL (104) |
FIG. 3
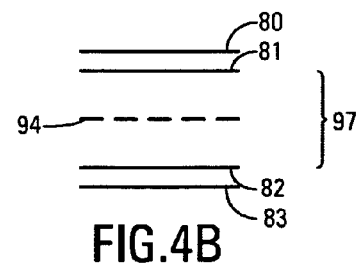
FIG. 4B

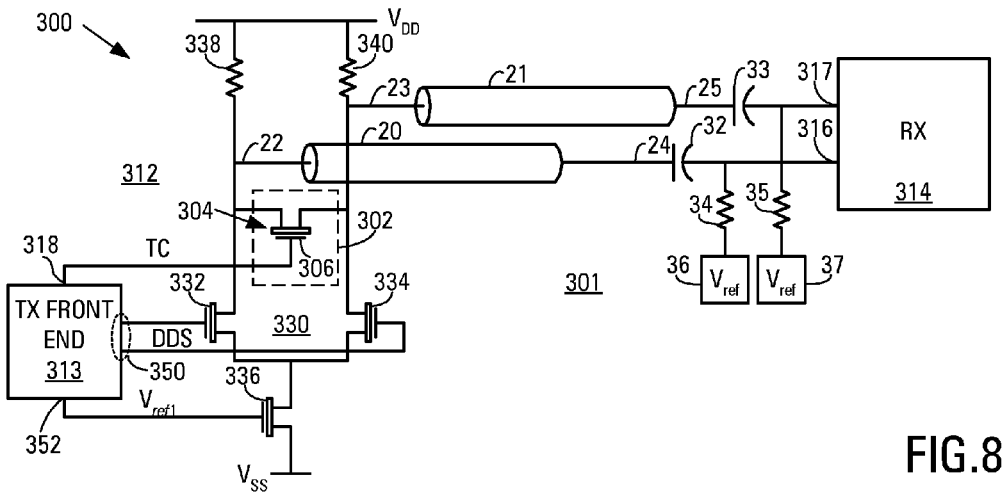

FIG.8

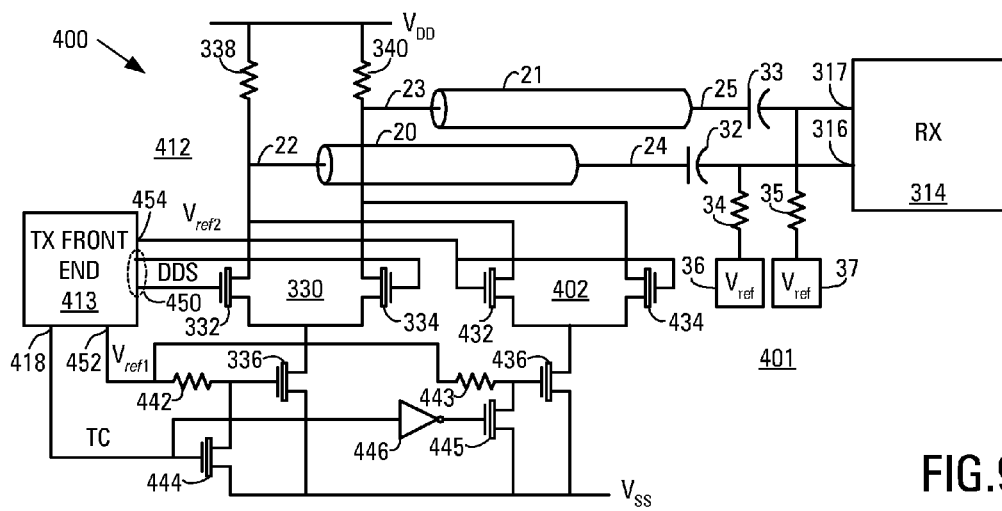

FIG.9

| IMPOSE DC-BALANCED SIGNAL ON INPUT OF TRANSMISSION LINE. THE IMPOSING CHANGES AVERAGE DC LEVEL AT OUTPUT OF TRANSMISSION LINE (502) |
|---|
| ↓ 500 |
| AT START OF IMPOSING DC-BALANCED SIGNAL ON INPUT OF TRANSMISSION LINE, ADDITIONALLY IMPOSE A COMPENSATING PULSE ON THE INPUT OF THE TRANSMISSION LINE. COMPENSATING PULSE COMPENSATES FOR THE CHANGE IN THE AVERAGE DC LEVEL AT OUTPUT OF TRANSMISSION LINE CAUSED BY THE IMPOSING (504) |

METHOD AND APPARATUS FOR SENDING DC-BALANCED SIGNALS OVER A TRANSMISSION LINE

BACKGROUND

In many applications, a transmission line is used to transport a high-frequency signal from one location to another. In an example, a transmission line on a printed circuit board is used to transport a signal from one integrated circuit to another. In another example, a transmission line on an integrated circuit is used to transport a signal from one location to another within the integrated circuit.

FIGS. 1A and 1B are block diagrams showing examples of a typical conventional data transmission system 10. Data transmission system 10 is composed of a transmitter 12 and a receiver 14 electrically coupled by a transmission line 20. Transmission line 20 is depicted as a coaxial transmission line for the purpose of illustration only. Any other type of transmission line may be used as transmission line 20. Transmission line 20 has an input 22 and an output 24. Transmitter 12 is electrically coupled to the input 22 of transmission line 20. The output 24 of transmission line 20 is electrically coupled to the input 16 of receiver 14. In the example shown in FIG. 1A, the output 24 of transmission line 20 is DC coupled to the input 16 of receiver 14. In the example shown in FIG. 1B, the output 24 of transmission line 20 is ac coupled to the input 16 of receiver 14 by a capacitor 32 and input 16 is biased by a resistor 34 connected to a voltage source 36. Receiver 14 has a threshold level and interprets a level at input 16 greater than the threshold level as a logical 1, for example, and a level less than the threshold level as a logical 0, for example, or vice versa.

In conventional data transmission system 10, transmitter 12 imposes a DC-balanced signal of the input 22 of transmission line 20 for transmission to receiver 14. Transmitter 12 generates such DC-balanced signal by mixing the original data to be transmitted with a pseudo-random bitstream. The process is reversed in receiver 14 to recover the original data. The DC-balanced signal is DC-balanced in the sense that the temporal density of high states in the signal is equal to the temporal density of low states in the signal. As a result, the DC-balanced signal has a substantially constant average DC level.

A conventional transmission line-based data transmission system such as data transmission system 10 suffers from a loss of data at the start of each transmission. Such data loss is undesirable.

Some conventional data transmission systems additionally have an auxiliary receiver (not shown) collocated with the transmitter and an auxiliary transmitter collocated with the receiver. An error detection process applied to the data output by the receiver indicates that data has been lost at the beginning of the transmission. The auxiliary transmitter then sends a message to the auxiliary receiver to cause the auxiliary receiver to instruct the transmitter to re-send the data. This retransmission process degrades the transmission efficiency of the data transmission system. Moreover, the need for an auxiliary transmitter and an auxiliary receiver increases the cost of transmission system and increases its power consumption.

Accordingly, what is needed is a way to transmit a DC-balanced signal via a transmission line in which data is not lost at the start of each transmission.

BRIEF DESCRIPTION OF THE DRAWINGS

FIGS. 2A-2F are graphs illustrating the operation of the examples of the conventional data transmission system shown in FIGS. 1A and 1B.

FIG. 3 is a flow chart showing an example of method in accordance with an embodiment of the invention for transmitting a DC-balanced signal via a transmission line.

FIG. 4A is a schematic drawing showing exemplary levels at the output of the transmission line in an example in which the output of the transmission line is DC coupled to the input of the receiver.

FIG. 4B is a schematic drawing showing exemplary levels at the output of the transmission line in an example in which the output of the transmission line is ac coupled to the input of the receiver.

FIG. 8 is a schematic diagram showing an example of a system in accordance with an embodiment of the invention for transmitting a DC-balanced signal via a transmission line in which the hold circuit modifies the operation of the output stage of the transmitter.

FIG. 9 is a schematic diagram showing an example of a system in accordance with an embodiment of the invention for transmitting a DC-balanced signal via a transmission line in which the hold circuit modifies the operation of the output stage of the transmitter.

FIG. 10 is a flow chart showing an example of method in accordance with another embodiment of the invention for transmitting a DC-balanced signal via a transmission line.

DETAILED DESCRIPTION

Figure 1A:
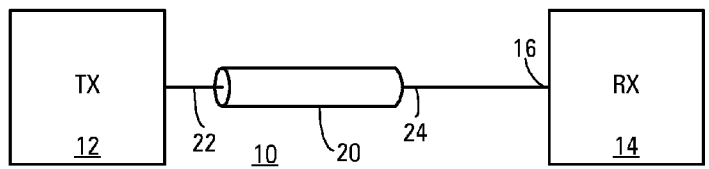
FIGS. 1A and 1B are block diagrams showing examples of a typical conventional data transmission system.
Figure 1B:
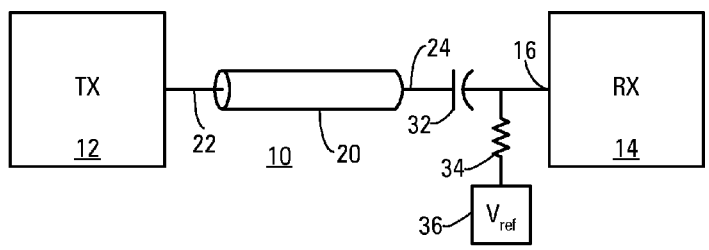
Figure 2A:
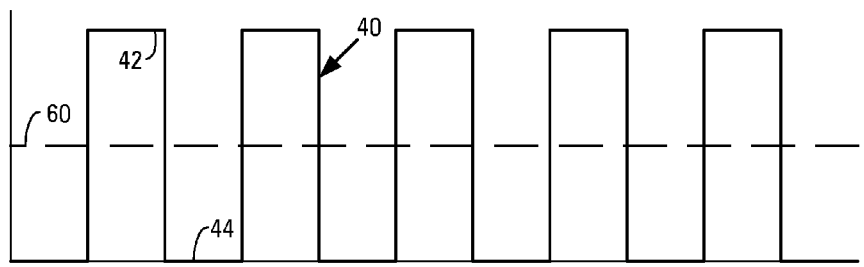
Figure 2B:
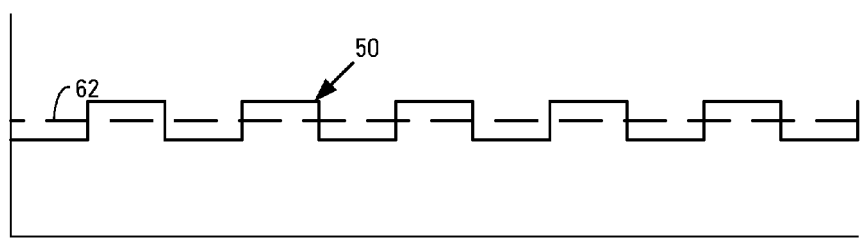
Figure 2C:
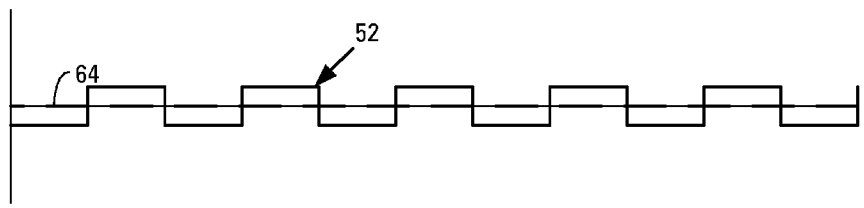

FIGS. 2A-2F are graphs illustrating the operation of the examples of conventional data transmission system 10 shown in FIGS. 1A and 1B to transmit a DC-balanced signal from transmitter 12 to receiver 14. FIGS. 2A and 2B respectively show waveforms at the input 22 and the output 24 of transmission line 20. The waveform at the output of transmission line 20 shown in FIG. 2B is also the waveform at the input 16 of receiver 14 in the example of conventional data transmission system 10 shown in FIG. 1A. FIG. 2C shows the waveform at the input 16 of receiver 14 in the example of conventional data transmission system 10 shown in FIG. 1B.

Transmitter 12 imposes a DC-balanced signal on the input 22 of transmission line 20 for transmission to receiver 14. FIG. 2A shows the waveform 40 of the DC-balanced signal at the input 22 of transmission line 20. Reference numeral 40 will additionally be used to refer to the DC-balanced signal imposed on the input 22 of transmission line 20. DC-balanced signal 40 swings from a high state having a high level 42 to a low state having a low level 44 and has an average DC level mid-way between high level 42 and low level 44. The average DC level of DC-balanced signal 40 is indicated by a broken line 60. Reference numeral 60 will additionally be used to refer to the average DC level of DC-balanced signal 40.

Transmission line 20 transmits the DC-balanced signal to its output 24. FIG. 2B shows the waveform 50 of the signal at the output 24 of transmission line 20. The signal at the output 24 of transmission line 20 will be referred to as a transmission line output signal and reference numeral 50 will additionally be used to refer to the transmission line output signal. Since the signal imposed on the input 22 of transmission line 20 is a DC-balanced signal, transmission line output signal 50 is also a DC-balanced signal and has an average DC level.

The average DC level of transmission line output signal 50 is indicated in FIG. 2B by a broken line 62. Reference numeral 62 will additionally be used to refer to the average DC level of transmission line output signal 50. The ac components of DC-balanced signal 40 imposed on the input 22 of transmission line 20 are attenuated by transmission through transmission line 20, so the peak-to-peak amplitude of transmission line output signal 50 is less than that of DC-balanced signal 40. However, the DC component of DC-balanced signal 40 is not attenuated, or is attenuated significantly less than the ac components, by transmission through the transmission line. Consequently, during the transmission of DC-balanced signal 40 shown in FIGS. 2A and 2B, the average DC level 62 of transmission line output signal 50 is nominally equal to the average DC level 60 of DC-balanced signal 40.

In conventional data transmission system 10 described above with reference to FIG. 1A, transmission line output signal 50 is DC coupled to the input 16 of receiver 14 so that transmission line output signal 50 is also the DC-balanced signal at the input 16 of receiver 14. The DC-balanced signal at the input 16 of receiver 14 will be referred to as a receiver input signal. In this example, the threshold level of receiver 14 is nominally equal to the average DC level 62 of the receiver input signal. Reference numeral 62 will additionally be used to refer to the threshold level of receiver 14 in this example. The level of the receiver input signal varies about the threshold level 62 of receiver 14 and receiver 14 correctly determines the logical states represented by the high and low levels of the transmission line output signal.

In exemplary data transmission system 10 described above with reference to FIG. 1B, the input 16 of receiver 14 is ac coupled to the output 24 of transmission line 20 by capacitor 32 and input 16 is biased by resistor 34 connected to voltage source 36. The voltage output by voltage source 36 is nominally equal to the threshold level of receiver 14. The DC-balanced signal coupled to the input 16 of receiver 14 by capacitor 32 will be referred to as a receiver input signal.

FIG. 2C shows the waveform 52 of the receiver input signal. Reference numeral 52 will additionally be used to refer to the receiver input signal. Resistor 34 holds input 16 at a DC level 64 nominally equal to the threshold level of receiver 14. Capacitor 32 couples transmission line output signal 50 to input 16 so that receiver input signal 52 varies about DC level 64. Thus, receiver input signal 52 has an average DC level nominally equal to DC level 64. A DC voltage equal to the difference between the average DC level 62 of transmission line output signal 50 and DC level 64 exists across capacitor 32. In the example shown in FIG. 2C, the average DC level 62 of transmission line output signal 50 is greater than zero volts and DC level 64 is equal to zero volts. The level of receiver input signal 52 varies about DC level 64 and receiver 14 correctly determines the logical states represented by the high and low levels of the receiver input signal.

FIGS. 2D and 2E respectively show the waveforms at the input 22 and the output 24 of transmission line 20 at the start of a transmission of DC-balanced signal 40 from transmitter 12 to receiver 14 via transmission line 20. The waveform at the output of transmission line 20 shown in FIG. 2E is also the waveform the input 16 of receiver 14 in the example of conventional data transmission system 10 shown in FIG. 1A. FIG. 2F shows the waveform at the input 16 of receiver 14 in the example of conventional data transmission system 10 shown in FIG. 1B. Also shown in FIG. 2D, and additionally applicable to FIGS. 2E and 2F, are temporal region 70 and temporal region 72. In temporal region 70, transmitter 12 imposes DC-balanced signal 40 on the input 22 of transmission line 20. Temporal region 72 is a temporal region immediately prior to temporal region 70, i.e., prior to the transmitter imposing the DC-balanced signal on the input of the transmission line.

Referring to FIG. 2D, in temporal region 72, transmitter 12 imposes on the input 22 of transmission line 20 a static level corresponding in level to one of the states of DC-balanced signal 40. In the example shown, transmitter 12 imposes a static level corresponding to the low level 44 of DC-balanced signal 40 on the input 22 of transmission line 20. The static level is substantially lower than the average DC level 60 of DC-balanced signal 40. In another example (not shown), transmitter 12 imposes on the input 22 of transmission line 20 a static level corresponding to the high level 42 of DC-balanced signal 40. This static level is substantially higher than the average DC level 60 of DC-balanced signal 40.

FIG. 2E shows the waveform of transmission line output signal 50 at the output 24 of transmission line 20 at the start of a transmission of DC-balanced signal 40 from transmitter 12 to receiver 14 via transmission line 20. In the example shown, in temporal region 72, transmitter 12 imposes a static level corresponding to the low level 44 of DC-balanced signal 40 on the input 22 of transmission line 20, as described above with reference to FIG. 2D. Also in temporal region 72, transmission line output signal 50 is a constant DC level nominally equal to the low level 44 of DC-balanced signal 40. In the example of transmission system 10 shown in FIG. 1A, transmitter 12 imposing a static level equal to the low level 44 of DC-balanced signal on the input 22 of transmission line 20 in temporal region 72 holds the input 16 of receiver 14 at a static level nominally equal to low level 44.

FIG. 2F shows the waveform of receiver input signal 52 at the input 16 of receiver 14 at the start of a transmission of DC-balanced signal 40 from transmitter 12 to receiver 14 via transmission line 20 in an example of conventional data transmission system 10 shown in FIG. 1B. In temporal region 72, voltage source 36 and resistor 34 hold the input 16 of receiver 14 at a static level 43 that differs from the threshold level 64 of receiver 14. In the example shown, the threshold level of receiver 14 is zero volts. Other threshold levels are possible. Holding the input of the receiver at a static level that differs from the threshold level of the receiver holds the output of the receiver in a defined state and prevents noise at the input of the receiver from causing the output of the receiver to switch randomly between states. Transmission line output signal 50 is applied to one terminal of capacitor 32 and the other terminal of capacitor 32 is held at the static level defined by voltage source 36. Thus, in the example shown in which the voltage output by voltage source 36 is close to zero volts, capacitor 32 is substantially discharged at the beginning of temporal region 70.

In temporal region 70, transmitter 12 imposes DC-balanced signal 40 on the input 22 of transmission line 20, as shown in FIG. 2D. Consequently, at the beginning of temporal region 70, the average DC level at input 22 changes from the low level 44 to the average DC level 60 of DC-balanced signal 40. A similar change in the DC component of transmission line output signal 50 occurs at the output 24 of transmission line 20 as shown in FIG. 2E. However, the need to charge the capacitance of transmission line 20 causes the DC component of transmission line output signal 50 to change relatively slowly to a level equal to average DC level 60. The change in the DC component of transmission line output signal 50 is indicated by a broken line 66 in FIG. 2E. Reference numeral 66 will additionally be used to refer to the changing DC component of transmission line output signal 50. The ac components of transmission line output signal 50 are superimposed on the changing DC component 66.

In the example of conventional data transmission system 10 described above with reference to FIG. 1A in which the input 16 of receiver 14 is DC coupled to the output 24 of transmission line 20 and receiver 14 has a threshold level nominally equal to the average DC level 60 of DC-balanced signal 40, at the start of temporal region 70, the high states of transmission line output signal 50 are not sufficiently high in level to exceed the threshold level 62 of receiver 14 while the level of the changing DC component 66 of transmission line output signal 50 is substantially below threshold level 62. Until the changing DC component 66 of transmission line output signal 50 rises to a level at which the high states of transmission line output signal 50 are high enough in level to exceed threshold level 62, transmission line output signal 50 conveys no data to receiver 14 and the data transmitted by transmitter 12 is lost. As noted above, data loss is undesirable In the example of conventional data transmission system 10 described above with reference to FIG. 1B in which the input 16 of receiver 14 is ac coupled to the output 24 of transmission line 20 via capacitor 32, and the voltage output by voltage source 36 is close to zero volts, the first positive-going transient in transmission line output signal 50 at the beginning of temporal region 70 is applied to one terminal of capacitor 32. The other terminal of capacitor 32 applies a similar positive-going transient to the input 16 of receiver 14. The positive-going transient increases the voltage level on input 16 to a level at which the low states of receiver input signal 52 remain above the threshold level 64 of receiver 14. With input 16 in this state, receiver input signal 52 conveys no data to receiver 14, and the data transmitted by transmitter 12 is lost. As noted above, data loss is undesirable.

Capacitor 32 then charges via resistor 34 and the DC level on input 16 gradually falls as shown by the broken line 68. Once the DC level on input 16 falls to a level at which the low states of the receiver input signal 52 fall below threshold level 64, receiver 14 begins to correctly determine the logical states represented by the high and low levels of the receiver input signal.

FIG. 3 is a flow chart showing an example of method 100 in accordance with an embodiment of the invention for transmitting a DC-balanced signal via a transmission line. The transmission line has an input and an output. In block 102, a DC-balanced signal is imposed on the input of the transmission line. The DC-balanced signal has a high level and a low level, each having a respective DC level. In block 104, prior to imposing the DC-balanced signal on the input of the transmission line, the input of the transmission line is held at an intermediate DC level. The intermediate DC level is intermediate between the DC levels of the high state and the low state of the DC-balanced signal. In one embodiment, the intermediate DC level at which the input of the transmission line is held is nominally equal to the average DC level of the DC-balanced signal.

At the input of the transmission line, the DC-balanced signal has an amplitude, which is the difference between the high level and the low level of the DC-balanced signal. Transmission of the DC-balanced signal via the transmission line attenuates the ac components of the DC-balanced signal. Consequently, the amplitude of the transmission line output signal output by the transmission line is less than the amplitude of the DC-balanced signal. The amplitude of the transmission line output signal is the difference between the high level and the low level of the transmission line output signal. The intermediate DC level at which the input of the transmission line is held differs from the average DC level of the DC-balanced signal by less than the amplitude of the transmission line output signal. In some embodiments, the intermediate DC level at which the input of the transmission line is held differs from the average DC level of the DC-balanced signal by no more than one-half of the amplitude of the transmission line output signal. In other embodiments, the intermediate DC level at which the input of the transmission line is held differs from the average DC level of the DC-balanced signal by no more than one quarter of the amplitude of the transmission line output signal.

The transmission line output signal is received by a receiver having an input that is either DC coupled or ac coupled to the output of the transmission line in a manner similar to that shown in FIGS. 1A and 1B, respectively. FIG. 4A is a schematic drawing showing exemplary levels at the output of the transmission line in an example in which the output of the transmission line is DC coupled to the input of the receiver in an arrangement similar to that described above with reference to FIG. 1A. As noted above, the transmission line output signal has a high level and a low level. In practice, due to tolerances in the transmitter and the transmission line, both the high level and the low level of the transmission line output signal have respective specified ranges. Lines 80 and 81 indicate the maximum and minimum, respectively, of the range of the high level, and lines 82 and 83 indicate the maximum and minimum, respectively, of the range of the low level.

The receiver has a nominal threshold level indicated in FIG. 4A by a line 84. Typically, the receiver threshold level is nominally equal to the average DC level of transmission line output signal. In practice, due to tolerances, the receiver threshold level differs from the average DC level of the transmission line output signal by an offset that lies within a specified offset range. The input of the receiver is additionally subject to noise whose maximum amplitude can be regarded as being added to both extremes of the offset range of the receiver. Such addition results in a noise-enhanced offset range 88 whose maximum and minimum are indicated by lines 85 and 86, respectively. Noise at the input of the receiver can undesirably cause the output of the receiver to change state randomly when the intermediate DC level at which the input of the transmission line is held differs from the threshold level of the receiver by less than the maximum amplitude of the noise.

To ensure that the receiver is capable of detecting the high and low states of the transmission line output signal, the intermediate DC level at which the input of the transmission line is held should be intermediate between the minimum 81 of the range of the high level of the transmission line output signal and the maximum 82 of the range of the low level of the transmission line output signal. This range is indicated in FIG. 4A by a brace 87. Additionally, the intermediate DC level should also be outside noise-enhanced offset range 88 so that, in temporal region 72 (FIG. 2D), the transmitter holds the output of the receiver in a defined state, and noise at the input of the receiver does not cause the output of the receiver to switch randomly between states. Thus, the permissible range of the intermediate DC level is between the minimum 81 of the range of the high level of the transmission line output signal and the maximum 82 of the range of the low level of the transmission line output signal, but excludes the noise-enhanced offset range 88. The permissible range of the intermediate DC level is indicated by braces 89 in FIG. 4A. In the DC coupled case, a DC level at which the input of the transmission line is held within the range indicated by braces 89 will be regarded as being a DC level nominally equal to the average DC level of the DC-balanced signal. FIG. 4B is a schematic drawing showing exemplary levels at the output of the transmission line in an example in which the output of the transmission line is ac coupled to the input of the receiver in a manner similar to that described above with reference to FIG. 1B. As noted above, the transmission line output signal has a high level and a low level. In practice, due to tolerances in the transmitter and the transmission line, both the high level and the low level of the transmission line output signal have respective specified ranges, as described above with reference to FIG. 4A. The average DC level at the output of the transmission line is indicated by a line 94. In the ac coupled case, the permissible range of the intermediate DC level is between the minimum 81 of the range of the high level of the transmission line output signal and the maximum 82 of the range of the low level of the transmission line output signal. The permissible range of the intermediate DC level is indicated in FIG. 4B by a brace 97. In the ac coupled case, an intermediate DC level at which the input of the transmission line is held within the range indicated by brace 97 will be regarded as being nominally equal to the average DC level of the DC-balanced signal.

Additionally, when the output of the transmission line is ac coupled to the input of the receiver, considerations similar to those described above with reference to FIG. 4A with respect to noise at the receiver input apply to the selection of voltage Vref that biases the input of the receiver. Thus, relative to the nominal threshold 84 of the receiver, the permissible range of voltage Vref is the same as that indicated by braces 89 in FIG. 4A.

Figure 5A:
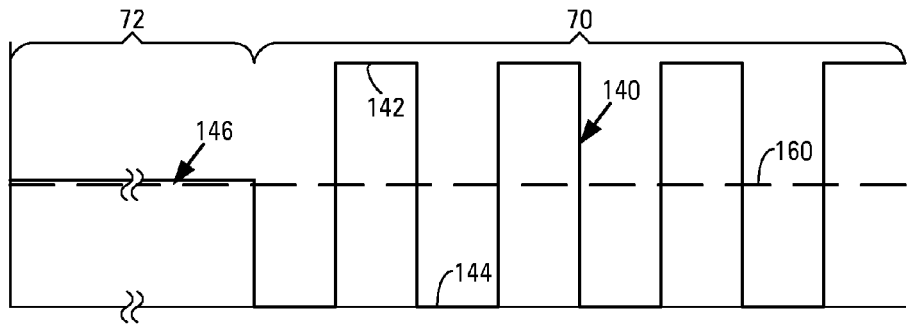
FIGS. 5A-5F are graphs illustrating the operation of examples of the data transmission method shown in FIG. 3 and examples of the system shown in FIGS. 6A and 6B.
Figure 5B:
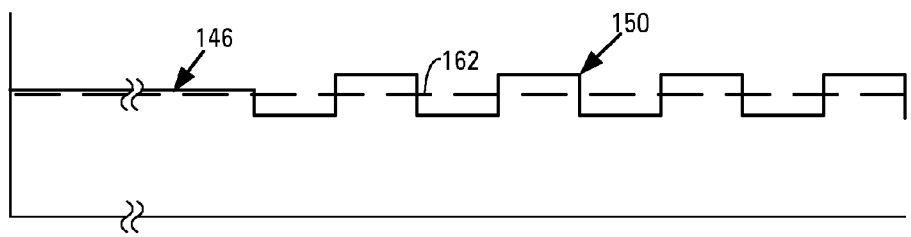
Figure 5C:
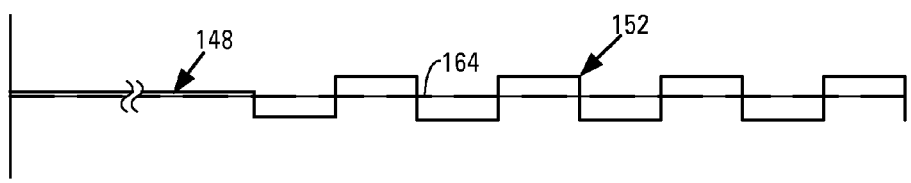

FIGS. 5A-5F are graphs illustrating the operation of examples of the data transmission method shown in FIG. 3 to transmit a DC-balanced signal via a transmission line. FIGS. 5A and 5B respectively show waveforms at the input and the output of the transmission line during and prior to imposition of the DC-balanced signal on the input of the transmission line in block 102 of method 100 (FIG. 3). The waveform shown in FIG. 5B is also the waveform at the input of the receiver in an example of method 100 in which the output of the transmission line is DC coupled in an arrangement similar to that shown in FIG. 1A. FIG. 5C shows the waveform at the input of the receiver in an example of method 100 in which the output of the transmission line is ac coupled in an arrangement similar to that shown in FIG. 1B. Also shown in FIG. 5A, and additionally applicable to FIGS. 5B-5F, are temporal region 70 in which the DC-balanced signal is imposed on the input of the transmission line and temporal region 72 prior to the DC-balanced signal being imposed on the input of the transmission line.

FIG. 5A shows waveforms at the input of the transmission line. In temporal region 70, FIG. 5A shows the waveform 140 of a DC-balanced signal imposed on the input of the transmission line in block 102 of method 100 (FIG. 3). Reference numeral 140 will also be used to refer to the DC-balanced signal imposed on the input of the transmission line. Similar to DC-balanced signal 40 described above with reference to FIG. 2A, DC-balanced signal 140 has a high state having a high DC level 142 and has a low state having a low DC level 144. In the example of DC-balanced signal 140 shown, to simplify the drawing, each high state is followed by a respective low state. In an actual DC-balanced signal, some of the high states are followed by one or more consecutive high states and some of the low states are followed by one or more consecutive low states. However, as described above, the temporal density of high states remains equal to the temporal density of low states during the transmission.

In temporal region 72, prior to DC-balanced signal 140 being imposed on the input of the transmission line, the input of the transmission line is held at an intermediate DC level 146 in block 104 of method 100. Intermediate DC level 146 at which the input of the transmission line is held is intermediate between the high level 142 and the low level 144 of DC-balanced signal 140, and is nominally equal to the average DC level of DC-balanced signal 140. The average DC level of DC-balanced signal 140 is indicated by a broken line 160. In the example shown, intermediate DC level 146 differs from the average DC level 160 of DC-balanced signal 140. In other embodiments, intermediate DC level 146 may be equal to the average DC level 160 of DC-balanced signal 140. Examples of such embodiments include those in which the output of the transmission line is ac coupled to the receiver, and those in which the output of the transmission line is DC coupled to the receiver but the receiver threshold differs from average DC level 160.

FIG. 5B shows the waveforms at the output of the transmission line. In temporal region 70, FIG. 5B shows the waveform 150 of the transmission line output signal output from the transmission line. Reference numeral 150 will also be used to refer to the transmission line output signal itself. The ac components of DC-balanced signal 140 (FIG. 5A) are attenuated by transmission through the transmission line, so the amplitude of transmission line output signal 150 is less than that of DC-balanced signal 140 shown in FIG. 5A. However, the DC component of DC-balanced signal 140 is not attenuated, or is attenuated significantly less than the ac components, by transmission through the transmission line so that the average DC level of transmission line output signal 150 is equal to that of DC-balanced signal 140. The average DC level of transmission line output signal 150 is indicated in FIG. 5B by a broken line 162.

In an example of method 100 in which the output of the transmission line is DC coupled to the input of the receiver and the receiver has a threshold voltage nominally equal to the average DC level 160 of DC-balanced signal 140 in an arrangement similar to that shown in FIG. 1A, the waveform 150 of the transmission line output signal shown in FIG. 5B is additionally the waveform of the receiver input signal at the input of the receiver. In this example, broken line 162 additionally represents the threshold level of the receiver and reference numeral 162 will additionally be used to refer to the threshold level of the receiver.

In temporal region 72, holding the input of the transmission line at intermediate DC level 146 nominally equal to the average DC level 160 of the DC-balanced signal holds the input of the receiver at the same intermediate DC level 146. Therefore, in temporal region 72, the input of the receiver is held at an intermediate DC level nominally equal to the average DC level of the DC-balanced signal. As noted above, intermediate DC level 146 differs from the threshold level 162 of the receiver by more than the noise level at the input of the receiver so that, in temporal region 72, the transmitter holds the output of the receiver in a defined state despite noise at the input of the receiver. However, to ensure that the receiver can distinguish the high and low states of the transmission line output signal at the beginning of temporal region 70, intermediate DC level 146 differs from threshold level 162 by less than the amplitude of transmission line output signal 150.

As a result of holding the input of the transmission line at intermediate DC level 146, at the beginning of temporal region 70 and subsequently, the high levels of the receiver input signal (indicated by transmission line output signal 150) are all greater than threshold level 162 and the low levels of the receiver input signal are all less than threshold level 162. Thus, when DC-balanced signal 140 is transmitted by a method in accordance with this embodiment of the invention, no data is lost at the start of the transmission.

FIG. 5C shows the waveform 150 of the receiver input signal in an example of method 100 in which the output of the transmission line is ac coupled to the input of the receiver and the receiver has a threshold level independent of the average DC of the DC-balanced signal. In the example shown, the threshold level of the receiver is zero volts, as indicated by a broken line 164. Reference numeral 164 will additionally be used to refer to the threshold level of the receiver. Other threshold voltages are possible.

In temporal region 72, prior to DC-balanced signal 140 being imposed on the input of the transmission line, holding the input of the transmission line at intermediate DC level 146 (FIG. 5A) nominally equal to the average DC level 160 of DC-balanced signal 140 holds the output of the transmission line at nominally the same DC level, as described above. Additionally, in temporal region 72, resistor 34 (FIG. 1B) holds the input of the receiver at a DC level 148 that differs from the threshold level 164 of the receiver by more than the noise level at the input of the receiver but less than the amplitude of receiver input signal 152, as described above with reference to FIG. 4A. When the DC-balanced signal is imposed on the input of the transmission line at the beginning of temporal region 70, any change in the DC level at the input of the transmission line is small compared with the amplitude of DC-balanced signal 142, as shown in FIG. 5A; any change in the DC level at the output of the transmission line is small compared with the amplitude of transmission line output signal 150, as shown in FIG. 5B and any change in the DC level at the input of the receiver is small compared with the amplitude of receiver input signal 152, as shown in FIG. 5C. Such change in the DC level at the input of the receiver is small compared with the amplitude of the receiver input signal because the voltage across the coupling capacitor changes negligibly between temporal regions 72 and 70. Consequently, changes in the level of receiver input signal 152 due to the imposition of DC-balanced signal 140 on the input of the transmission line immediately cross threshold level 164 of the receiver. Thus, when DC-balanced signal 140 is transmitted by a method in accordance with this embodiment of the invention, no data is lost at the start of the transmission.

In some embodiments, the input of the transmission line is released from its held state at or prior to the end of temporal region 72 to allow DC-balanced signal 140 to be imposed on the input of the transmission line. Once the input of the transmission line is released from its held state, the DC level of the input of the transmission line changes to the level of the static state, i.e., the low level or the high level, of the DC-balanced signal. However, the DC level at the output of the transmission line changes from its held level less quickly so that it remains close to its held level when the DC-balanced signal is imposed on the input of the transmission line. The maximum time that can elapse between the input of the transmission line being released from its held state and the DC-balanced signal being imposed on the input of the transmission line is less than that which would allow the DC level at the output of the transmission line to change from its held level by more than the amplitude of the transmission line output signal. DC offsets in the system can reduce this time.

Figure 5D:
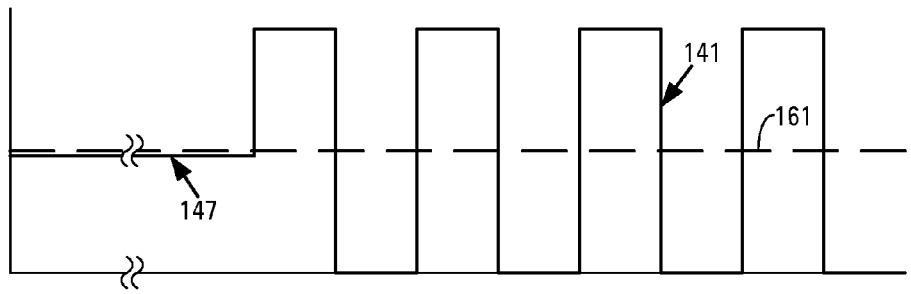
Figure 5E:
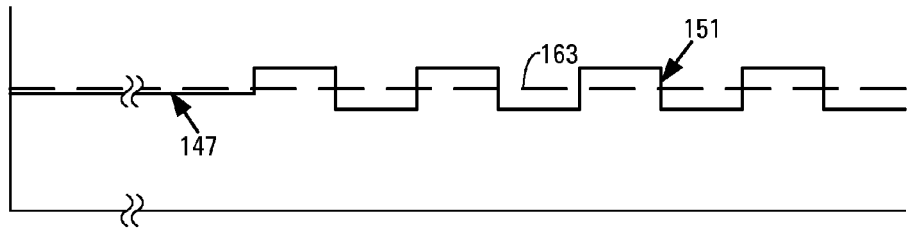
Figure 5F:
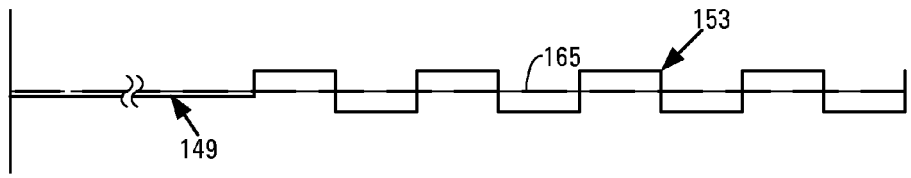

In many transmission systems, the transmitter is a differential transmitter having differential outputs, the receiver is a differential receiver having differential inputs, and two transmission lines connect the differential outputs of the transmitter to the differential inputs of the receiver. In such a transmission system, FIGS. 5A and 5B show the waveforms on the input and the output, respectively, of one of the transmission lines. FIG. 5B additionally shows the waveform at one of the inputs of the receiver in an example in which such one of the inputs is DC coupled to the output of the one of the transmission lines. FIG. 5C shows the waveform at one of the inputs of the receiver in an example in which such input is ac coupled to the output of the one of the transmission lines. Additionally, FIGS. 5D and 5E respectively show the waveforms on the input and the output, respectively, of the other of the transmission lines. FIG. 5D additionally shows the waveform at the other of the inputs of the receiver in an example in which such other of the inputs is DC coupled to output of the other of the transmission lines. FIG. 5F shows the waveform at the other of the inputs of the receiver in an example in which such other of the inputs is ac coupled to the output of the other of the transmission lines. The waveforms are shown prior to and during the transmission of a differential DC-balanced signal. In the example shown, DC-balanced signal 140 shown in FIG. 5A is the in-phase component of the differential DC-balanced signal and a DC-balanced signal 141 shown in FIG. 5D is the antiphase component of the differential DC-balanced signal. Similarly, transmission line output signal 150 shown in FIG. 5B is the in-phase component of the differential transmission line output signal and a transmission line output signal 151 shown in FIG. 5E is the antiphase component of the differential transmission line output signal. Finally, receiver input signal 152 shown in FIG. 5C is the in-phase component of the receiver input signal and a receiver input signal 153 shown in FIG. 5F is the antiphase component of the receiver input signal.

In temporal region 72, prior to imposing the differential DC-balanced signal on the transmission lines, the inputs of the transmission lines are held at respective intermediate DC levels each nominally equal to the average DC levels of the respective DC-balanced signals. The average DC level of DC-balanced signal 140 is shown at 160 in FIG. 5A and that of DC-balanced signal 141 is shown at 161 in FIG. 5D. The intermediate DC level at which the input of the one of the transmission lines is held is shown at 146 in FIG. 5A and that at which the input of the other of the transmission lines is held is shown at 147 in FIG. 5D.

In an embodiment of method 100 in which the output of each transmission line is DC coupled to the respective input of the differential receiver in an arrangement similar to that shown in FIG. 1A, intermediate DC levels 146 and 147 differ in sign from average DC levels 160 and 161, respectively, to ensure that the outputs of the differential receiver are held in defined, opposite states. Both transmission line output signals 150 and 151 cross the respective threshold levels 162 and 163 of the receiver inputs from the beginning of temporal region 70, as shown in FIGS. 5B and 5E, notwithstanding the opposite direction of the initial transient of DC-balanced signal 141 compared with that of DC-balanced signal 140.

In an embodiment of method 100 in which the output of each transmission line is ac coupled to the respective input of the differential receiver in an arrangement similar to that shown in FIG. 1B, the inputs of the differential receiver are DC biased in opposite directions relative to the respective thresholds of the differential receiver to hold the outputs of the receiver in defined opposite states. Both receiver input signals 152 and 153 cross the respective threshold levels 164 and 165 of the receiver inputs from the beginning of temporal region 70, as shown in FIGS. 5C and 5F, notwithstanding the opposite direction of the initial transient of DC-balanced signal 141 compared with that of DC-balanced signal 140.

Figure 6A:
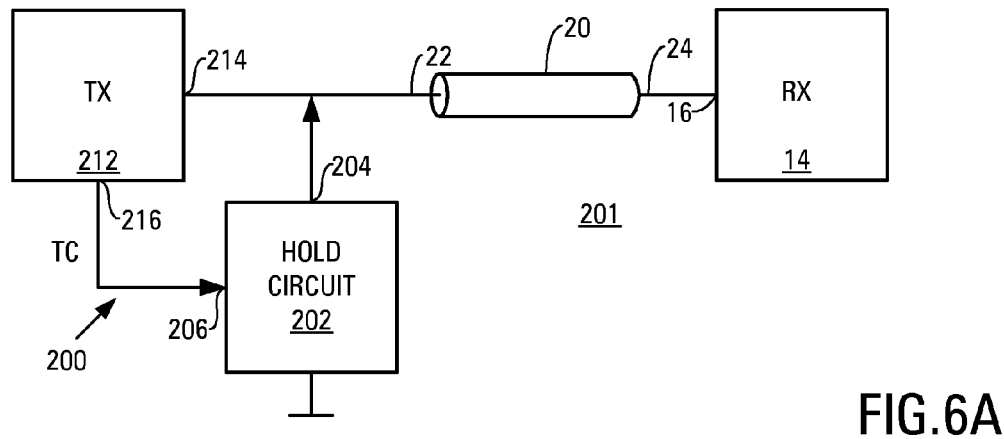
FIGS. 6A and 6B are block diagrams respectively showing a DC-coupled example and an ac-coupled example of a system for transmitting a DC-balanced signal via a transmission line in accordance with an embodiment of the invention.
Figure 6B:
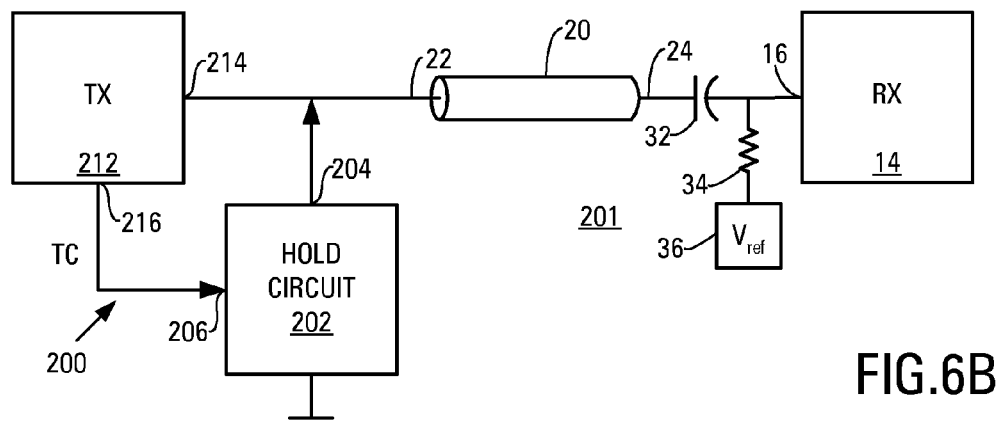

FIGS. 6A and 6B are block diagrams showing examples of a system 200 in accordance with an embodiment with the invention for transmitting a DC-balanced signal to a receiver 14 via transmission line 20. The output 24 of transmission line 20 is electrically coupled to the input 16 of receiver 14. In the example shown in FIG. 6A, the output 24 of transmission line 20 is DC coupled to the input 16 of receiver 14. In the example shown in FIG. 6B, the output 24 of transmission line 20 is ac coupled to the input 16 of receiver 14 by capacitor 32 and input 16 is biased by resistor 34 connected to voltage source 36. Receiver 14, transmission line 20, input 22, output 24, capacitor 32 and resistor 34 are described above with reference to FIGS. 1A and 1B, and will not be described again in detail here.

System 200 is composed of a transmitter 212 and a hold circuit 202. Transmitter 212 is operable to impose the DC-balanced signal on the input 22 of transmission line 20. The DC-balanced signal has a high state and a low state, each having a respective DC level. Hold circuit 202 is operable prior to transmitter 212 imposing the DC-balanced signal on the input 22 of transmission line 20, and performs the function of holding the input 22 of transmission line 20 at an intermediate DC level intermediate between the DC levels of the high state and the low state of the DC-balanced signal. In an embodiment, the intermediate DC level is nominally equal to an average DC level of the DC-balanced signal. As described above, holding the input 22 of transmission line 20 at an intermediate DC level intermediate between the DC levels of the high state and the low stage of the DC-balanced signal prior to transmitter 212 imposing the DC-balanced signal on the input of the transmission line prevents data loss at the beginning of the transmission. In the DC-coupled example shown in FIG. 6A, an intermediate DC level within the permissible range described above with reference to FIG. 4A will be regarded as being nominally equal to the average DC level of the DC-balanced signal, as described above. In the ac-coupled example shown in FIG. 6B, an intermediate DC level within the permissible range described above with reference to FIG. 4B will be regarded as being nominally equal to the average DC level of the DC-balanced signal, as described above.

In the examples shown in FIGS. 6A and 6B, hold circuit 202 has an output 204 and a control input 206, and transmitter 212 has a signal output 214 and a transmit control output 216. The output 204 of hold circuit 202 is electrically connected to the input 22 of transmission line 20. Hold circuit 202 holds the input 22 of transmission line 20 at the above-described intermediate DC level via output 204. The transmit control output 214 of transmitter 212 is electrically connected to the control input 206 of hold circuit 202. Transmitter 212 generates a transmit control signal TC and outputs transmit control signal TC at transmit control output 216. The state of transmit control signal TC indicates whether transmitter 212 is imposing the DC-balanced signal on the input 22 of transmission line 20. At times when it is not imposing the DC-balanced signal on the input 22 of transmission line 20, transmitter 212 outputs transmit control signal TC in a first state. In response to transmit control signal TC in the first state received at control signal input 206, hold circuit 202 holds the input 22 of transmission line 20 at the above-described intermediate DC level. Otherwise, transmitter 212 outputs transmit control signal TC in a second state. In response to transmit control signal TC in the second state received at control signal input 206, hold circuit 202 releases the input 22 of transmission line 20 from its held state. This allows the DC-balanced signal output by transmitter 212 to be imposed on the input 22 of transmission line 20.

Conventional transmitters suitable for use as transmitter 212 typically generate a transmission start signal at the beginning of each transmission. In some embodiments of system 200, such transmission start signal is used as above-mentioned transmit control signal TC. In other embodiments, transmit control signal TC is generated in response to changes in the state of the transmission start signal.

FIGS. 6A and 6B additionally show examples of a data transmission system 201 in accordance with an embodiment with the invention. System 201 is composed of transmitter 212, hold circuit 202, receiver 14 and transmission line 20 all as described above. In the example shown in FIG. 6A, the output 24 of transmission line 20 is DC coupled to the input 16 of receiver 14. In the example shown in FIG. 6B, the output 24 of transmission line 20 is ac coupled to the input 16 receiver 14 by capacitor 32 and input 16 is biased by resistor 34 connected to voltage source 36. The range of DC levels at which voltage source 36 and resistor 34 bias input 16 is described above with reference to FIGS. 4A and 4B.

Figure 7:
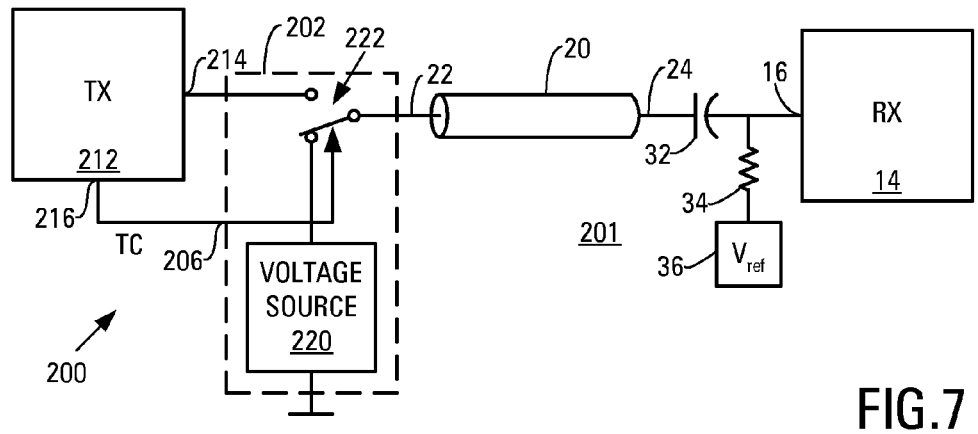
FIG. 7 is a schematic diagram showing an example of a system in accordance with an embodiment of the invention for transmitting a DC-balanced signal via a transmission line in which the hold circuit is composed of a voltage source and a controlled switch.

FIG. 7 is a schematic diagram showing an example of system 200 for transmitting a DC-balanced signal via a transmission line in which hold circuit 202 is composed of a voltage source 220 and a controlled switch 222. Controlled switch 222 is a single-pole changeover switch having two contacts, a common terminal and a control input. Voltage source 220 generates an intermediate DC voltage nominally equal to the average DC level of the DC-balanced signal imposed on the input 22 of transmission line 20 by transmitter 212. Voltage source 220 is connected to one contact of controlled switch 222. The other contact of controlled switch 222 is connected to the signal output 214 of transmitter 212. The common terminal of controlled switch 222 is connected to the input 22 of transmission line 20. The control terminal of controlled switch 222 is connected to the transmit control output 216 of transmitter 212 via control input 206.

In operation, when transmitter 212 is not transmitting the DC-balanced signal, transmitter 212 outputs transmit control signal TC in the first state. In response to transmit control signal TC in the first state, controlled switch 222 connects the input of transmission line 22 to voltage source 220. Thus, with transmit control signal TC in its first state, voltage source 220 holds the input 22 of transmission line 20 at an intermediate DC level nominally equal to the DC level of the DC-balanced signal output by transmitter 212. Otherwise, transmitter 212 outputs transmit control signal TC in the second state. In response to transmit control signal TC in the second state, controlled switch 222 connects the input 22 of transmission line 20 to the signal output 214 of transmitter 212.

This releases the input 22 of transmission line 20 from its held state and allows transmitter 212 to impose the DC-balanced signal on the input 22 of transmission line 20.

Circuit structures different from that just described can be used as hold circuit 202 and to perform the function of holding the input 22 of transmission line 20 at an intermediate DC level nominally equal to the average DC level of the DC-balanced signal prior to transmitter 212 imposing the DC-balanced signal on the input 22 of transmission line 20.

FIG. 7 additionally shows an example of a data transmission system 201 in accordance with an embodiment with the invention. System 201 is composed of transmitter 212, hold circuit 202, receiver 14 and transmission line 20 all as described above. In the example shown, the output 24 of transmission line 20 is ac coupled to the input 16 of receiver 14 by capacitor 32 and input 16 is biased by resistor 34 connected to voltage source 36. Alternatively, the output 24 of transmission line 20 is DC coupled to the input 16 of receiver 14 in a manner similar to that described above with reference to FIG. 6A.

FIG. 8 is a schematic diagram showing an example of a system 300 in accordance with an embodiment of the invention for transmitting a DC-balanced signal via a transmission line. In this example, the hold circuit modifies the operation of the output stage of the transmitter. FIG. 8 shows a transmitter 312 that transmits a DC-balanced signal to a receiver 314. Transmitter 312 and receiver 314 are differential devices coupled via transmission lines 20 and 21. In the example shown, the output 24 of transmission line 20 is ac coupled to an input 316 of receiver 314 by capacitor 32 and input 316 is biased by resistor 34 connected to voltage source 36. The output 25 of transmission line 21 is ac coupled to an input 317 of receiver 314 by a capacitor 33 and input 317 is biased by a resistor 35 connected to a voltage source 37. Relative to the threshold of receiver 314, voltage sources 36 and 37 differ in polarity. Alternatively, the outputs 24 and 25 of transmission lines 20 and 21, respectively, are DC coupled to the inputs 316 and 317, respectively, of receiver 314 in a manner similar to that described above with reference to FIG. 6A. In this case, inputs 316 and 317 of receiver 314 have thresholds that differ in polarity from the average DC level at the output of transmission lines 20 and 21 to ensure that equal intermediate DC levels at the inputs of transmission lines 20 and 21 in temporal region 72 will hold the differential outputs of receiver 314 in defined, opposite states.

Transmitter 312 is composed of a transmitter front end 313 and an output circuit 330. Transmitter front end 313 is conventional and is therefore shown as a block to simplify the drawing. Transmitter front end 313 has a signal input (not shown), a differential drive signal output 350, a reference voltage output 352 and a transmit control output 318.

Output stage 330 is composed of differentially-connected transistors 332 and 334, current sink transistor 336 and load resistors 338 and 340. Load resistors 338 and 340 are nominally equal in value. Transistors 332 and 334 are nominally equal in channel width. The drain of transistor 332 is connected via load resistor 338 to a supply rail $V_{DD}$. The node between the drain of transistor 332 and load resistor 338 is connected to the input 22 of transmission line 20. The drain of transistor 334 is connected via load resistor 340 to supply rail $V_{DD}$. The node between drain of transistor 334 and load resistor 340 is connected to the input 23 of transmission line 21. The gates of transistors 332 and 334 are connected to the drive signal output 350 of transmitter front end 313 to receive a differential drive signal DDS. The sources of transistors 332 and 334 are connected to the drain of current sink transistor 336. The gate of transistor 336 is connected to the reference voltage output 352 of transmitter front end 313 to receive a reference voltage $V_{ref1}$. Alternatively, a reference voltage source (not shown) that provides reference voltage $V_{ref1}$ may be external to transmitter front end 313. The source of transistor 336 is connected to a supply rail $V_{SS}$.

In this embodiment, hold circuit 302 is connected between the drains of transistors 332 and 334 and is composed of a controlled switch 304 connected to the drains of transistors 332 and 334. The controlled switch has a control input connected to receive transmit control signal TC from the transmit control output 318 of transmitter front end 313. In the specific example shown, controlled switch 304 is composed of a transistor 306 having its source connected to the drain of transistor 332, its drain connected to the drain of transistor 334 and its gate connected to receive transmit control signal TC from transmit control output 318. Hold circuit 302 may comprise a different type of controlled switch from controlled switch 304 exemplified above.

Referring additionally to FIG. 5A, in temporal region 70, the driver signal output 350 of transmitter front end 313 supplies dynamic differential drive signal DDS to the gates of transistors 332 and 334 and the transmit control output 318 of transmitter front end 313 supplies transmit control signal TC to hold circuit 302. The dynamic differential drive signal represents a DC-balanced signal. Transmit control signal TC is in a state that holds controlled switch 304 OFF. In response to the dynamic differential DC-balanced drive signal received from the drive signal output 350 of transmitter front end 313, transistors 332 and 334 alternately steer current received from load resistors 338 and 340, respectively, to current sink transistor 336. As a result, output stage 330 imposes antiphase components of the DC-balanced signal on the inputs of transmission lines 20 and 21. Transmission lines 20 and 21 convey the antiphase components of the DC-balanced signal to receiver 314 in a manner similar to that described above with reference to FIGS. 5A-5C.

The average DC level at the input of each transmission line 20, 21 is nominally equal to the DC voltage on supply rail $V_{DD}$ minus one-half of the maximum voltage drop across the respective one of load resistors 338 and 340. The average DC level is therefore equal to the DC voltage on supply rail $V_{DD}$ minus one-half of the product of the resistance of the respective load resistor and current sunk by transistor 336.

In temporal region 72, prior to transmitter 312 imposing the DC-balanced signal on the inputs 22, 23 of transmission lines 20, 21, the drive signal output 350 of transmitter front end 313 applies a static differential drive signal DDS to the gates of transistors 332 and 334. In an example, the static differential drive signal applied to the gates of transistors 332 and 334 turns transistor 332 ON and turns transistor 334 OFF. Absent hold circuit 302, output stage 330 would operate in response to the static differential drive signal to impose a static low level on the input 22 of transmission line 20 and a static high level on the input 23 of transmission line 21. Such static levels imposed on the inputs of transmission lines 20, 21 would cause a data loss at the beginning of temporal region 70 when output stage 330 imposes the DC-balanced signal on the input of the transmission lines, as described above with reference to FIGS. 2D-2F. However, with hold circuit 302, in temporal region 72, the transmit control output 318 of transmitter front end 313 supplies transmission control signal TC to hold circuit 302 in a state that turns controlled switch 304 ON. In its ON state, controlled switch 304 connects load resistors 338 and 340 in parallel. Current passes through load resistors 338 and 340 in parallel and transistor 332 to current sink transistor 336. This holds the DC level the input of each transmission line 20, 21 at a DC level equal to the voltage on supply rail $V_{DD}$ minus the product of the resistance of load resistors 338 and 340 in parallel and the current sunk by transistor 336. Thus, the intermediate DC levels at which the inputs 22, 23 of transmission lines 21, 22 are held are nominally equal to the average DC levels of the respective DC-balanced signals imposed by transmitter 312 on the inputs of the transmission lines. Holding the inputs 22, 23 of transmission lines 20, 21 at intermediate DC levels nominally equal the average DC levels of the respective DC-balanced signals imposed on the inputs of the transmission lines prevents the loss of data at the beginning of temporal region 70.

In another example, in temporal region 72, the static differential drive signal DDS applied to the gates of transistors 332 and 334 turns transistor 332 OFF and turns transistor 334 ON, and, absent hold circuit 302, output stage 330 would impose a static high level on the input 22 of transmission line 20 and a static low level on the input 23 of transmission line 21. In this example, with hold circuit 302 present and with controlled switch 304 turned ON, current passes through load resistors 338 and 340 in parallel and transistor 334 to current sink transistor 336, and the inputs 22, 23 of transmission lines 20, 21 are again held at intermediate DC levels nominally equal to the average DC level of the respective DC-balanced signals imposed on the inputs of the transmission lines.

FIG. 8 additionally shows an example of a data transmission system 301 in accordance with an embodiment with the invention. System 301 is composed of transmitter 312, hold circuit 302, receiver 314, transmission line 20 and transmission line 21, all as described above. In the example shown, the output 24 of transmission line 20 is ac coupled to the input 316 of receiver 314 by capacitor 32 and input 316 is biased by resistor 34 connected to voltage source 36. Additionally, the output 25 of transmission line 21 is ac coupled to the input 317 of receiver 314 by capacitor 33 and input 317 is biased by resistor 35 connected to voltage source 37. Alternatively, the outputs 24 and 25 of transmission lines 20 and 21, respectively, are DC coupled to the inputs 316 and 317, respectively, of receiver 314 in an arrangement similar to that described above with reference to FIG. 6A.

FIG. 9 is a schematic diagram showing an example of a system 400 in accordance with an embodiment of the invention for transmitting a DC-balanced signal via a transmission line. In this example, the hold circuit also modifies the operation of the output stage of the transmitter. FIG. 9 shows a transmitter 412 that transmits a DC-balanced signal to receiver 314. Transmitter 412 and receiver 314 are differential devices coupled via transmission lines 20, 21. The output 24 of transmission line 20 is ac coupled to the input 316 of receiver 314 by capacitor 32 and input 316 is biased by resistor 34 connected to voltage source 36. The output 25 of transmission line 21 is ac coupled to the input 317 of receiver 314 by capacitor 33 and input 317 is biased by resistor 35 connected to voltage source 37.

Transmitter 412 is composed of a transmitter front end 413 and output circuit 330. Transmitter front end 413 is conventional and is therefore shown as a block to simplify the drawing. Transmitter front end 413 has a signal input (not shown), a differential drive signal output 450, a reference voltage output 452, a reference voltage output 454 and a transmit control output 418.

Output stage 330 is described above with reference to FIG. 8 and will not be described again in detail here. In output stage 330, a resistor 442 is interposed between the gate of current sink transistor 336 and the reference voltage output 452 of transmitter front end 413 that supplies reference voltage $V_{ref1}$.

In system 400, hold circuit 402 is composed of differentially-connected transistors 432 and 434 and a current sink transistor 436. Differentially-connected transistors 432 and 434 are nominally equal in channel width to transistors 332 and 334, and current sink transistor 436 is nominally equal in channel width to current sink transistor 336. The drains of transistors 432 and 434 are connected to the drains of transistors 332 and 334, respectively. The gates of transistors 432 and 434 are connected to the reference output 454 of transmitter front end 413 to receive a reference voltage $V_{ref2}$. The drain of current sink transistor 436 is connected to the sources of transistors 432 and 434. The gate of transistor 436 is connected via a resistor 443 to the reference voltage output 452 of transmitter front end 413 to receive reference voltage $V_{ref1}$. Drain and source of a transistor 444 are connected to the gate and source, respectively, of transistor 336. The gate of transistor 444 is connected to the transmit control output 418 of transmitter front end 413 to receive transmit control signal TC. Drain and source of a transistor 445 are connected to the gate and source, respectively, of transistor 436. The gate of transistor 445 is connected via an inverter 446 to the transmit control output 418 of transmitter front end 413. Either or both of the reference voltage sources (not shown) that provide reference voltage $V_{ref1}$ and reference voltage $V_{ref2}$ may be external to transmitter front end 413.

In an example in which the outputs 24 and 25 of transmission lines 20 and 21, respectively, are ac coupled to the inputs 316 and 317, respectively, of receiver 314 as shown, transistors 432 and 434 are equal in channel width. In an example in which the outputs 24 and 25 of transmission lines 20 and 21, respectively, are DC coupled to the inputs 316 and 317, respectively, of receiver 314, and the inputs 316 and 317 of receiver 314 differ in threshold, transistors 432 and 434 can also be equal in channel width. In an example in which the outputs 24 and 25 of transmission lines 20 and 21, respectively, are DC coupled to the inputs 316 and 317, respectively, of receiver 314, and the inputs 316 and 317 of receiver 314 nominally have the same threshold, transistors 432 and 434 differ slightly in channel width so that, in temporal region 72, transmitter 400 holds the outputs (not shown) of differential receiver 314 in defined, opposite states, notwithstanding noise on the inputs, as described above.

Referring additionally to FIG. 5A, in temporal region 70, the drive signal output 450 of transmitter front end 413 supplies a dynamic differential drive signal DDS to the gates of transistors 332 and 334 and the transmit control output 418 of transmitter front end 413 supplies transmit control signal TC to hold circuit 402. The dynamic differential drive signal represents a DC-balanced signal. Transmit control signal TC is in a state that holds transistor 444 OFF and, inverted by inverter 446, holds transistor 445 ON. Consequently, current sink transistor 336 sinks current from transistors 332 and 334. In response to the dynamic differential drive signal, transistors 332 and 334 alternately steer current received from load resistors 338 and 340, respectively, to current sink transistor 336. Transistor 445 in its ON state holds current sink transistor 436 OFF. Consequently, neither transistor 432 nor transistor 434 draws current from resistors 338 and 340, respectively.

In response to the dynamic differential drive signal, output stage 330 imposes antiphase components of the DC-balanced signal on the inputs 22, 23 of transmission lines 20, 21. Transmission lines 20, 21 convey the antiphase components of the DC-balanced signal to the inputs 316 and 317 of receiver 314 in a manner similar to that described above with reference to FIGS. 5A-5F.

The average DC level at the input of each transmission line 20, 21 is equal the DC voltage on supply rail $V_{DD}$ minus one-half of the product of the resistance of the respective load resistor 338, 340 and the current sunk by current sink transistor 336, as described above.

In temporal region 72 (FIG. 5A), prior to transmitter 412 imposing the DC-balanced signal on the inputs 22, 23 of transmission lines 20, 21, the drive signal output 450 of transmitter front end 413 applies a static differential drive signal DDS to the gates of transistors 332 and 334 and the transmit control output 418 of transmitter front end 413 supplies the transmission control signal TC to hold circuit 402 in a state that turns transistor 444 ON. In its ON state, transistor 444 turns current sink transistor 336 OFF. As a result, transistors 332 and 334 draw no current from resistors 338 and 340, respectively, regardless of the static levels applied to their gates. Additionally, transmit control signal TC inverted by inverter 446 turns transistor 445 OFF, which in turn turns current sink transistor 436 ON. In response, transistors 432 and 434 draw equal currents from load resistors 338 and 340, respectively, and the input 22, 23 of each transmission line 20, 21 is held at a DC level equal to the voltage on supply rail $V_{DD}$ minus the product of the resistance of the respective load resistor and one-half of the current sunk by current sink transistor 436. The intermediate DC levels at which the inputs of the transmission lines are held are therefore nominally equal to the average DC levels of the respective DC-balanced signals imposed by transmitter 412 on the inputs 22, 23 of transmission lines 20, 21. As described above, holding the inputs 22, 23 of transmission lines 20, 21 at intermediate DC levels nominally equal to the average DC levels of the respective DC-balanced signals imposed on the inputs of the transmission lines prevents the loss of data at the beginning of temporal region 70.

FIG. 9 additionally shows an example of a data transmission system 401 in accordance with an embodiment with the invention. System 401 is composed of transmitter 412, hold circuit 402, receiver 314, transmission line 20 and transmission line 21, all as described above. In the example shown, the output 24 of transmission line 20 is ac coupled to the input 316 of receiver 314 by capacitor 32 and input 316 is biased by resistor 34 connected to voltage source 36. Additionally, the output 25 of transmission line 21 is ac coupled to the input 317 of receiver 314 by capacitor 33 and input 317 is biased by resistor 35 connected to voltage supply 37. Alternatively, the outputs 24 and 25 of transmission lines 20 and 21, respectively, are DC coupled to the inputs 316 and 317, respectively, of receiver 314 in a manner similar to that described above with reference to FIG. 6A.

Many large-scale integrated circuits implement power-saving schemes that reduce the power consumption of the integrated circuit during periods of inactivity. Preventing data loss at the beginning of a transmission by holding the input of the transmission line at an intermediate DC level nominally equal to the average DC level of the DC-balanced signal as in the above-described embodiments may consume power that undesirably increases the power consumption of the integrated circuit in its inactive state.

FIG. 10 is a flow chart showing an example of method 500 in accordance with an embodiment of the invention for transmitting a DC-balanced signal via a transmission line. The transmission line has an input and output. In block 502, a DC-balanced signal is imposed on the input of the transmission line. Imposing the DC-balanced signal on the input of the transmission line changes the average DC level at the output of the transmission line. In block 504, at the start of imposing the DC-balanced signal on the input of the transmission line, a compensating pulse is additionally imposed on the input of the transmission line. The compensating pulse compensates for the change in the average DC level at the output of the transmission line caused by imposing the DC-balanced signal on the input of the transmission line.

In an embodiment in which the output of the transmission line is DC coupled, the compensating pulse has the same polarity as the voltage difference between the static level of the input of the transmission line prior to the DC-balanced signal being imposed thereon and the average DC level of the DC-balanced signal. In an embodiment in which the output of the transmission line is ac coupled, the compensating pulse is opposite in polarity to the voltage difference between the static level of the input of the transmission line prior to the DC-balanced signal being imposed thereon and the average DC level of the DC-balanced signal.

Figure 11A:
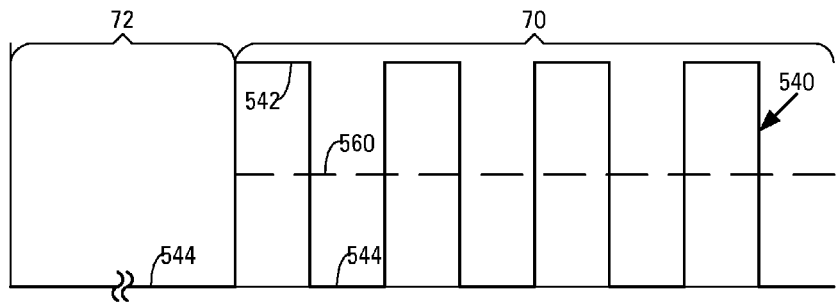
FIGS. 11A-11D are graphs illustrating the operation of an example of the data transmission method shown in FIG. 10 in which the output of the transmission line is DC coupled.
Figure 11B:
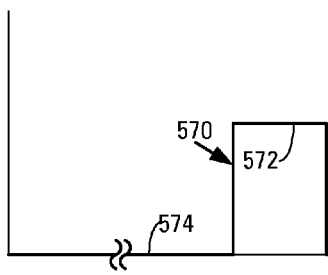
Figure 11C:
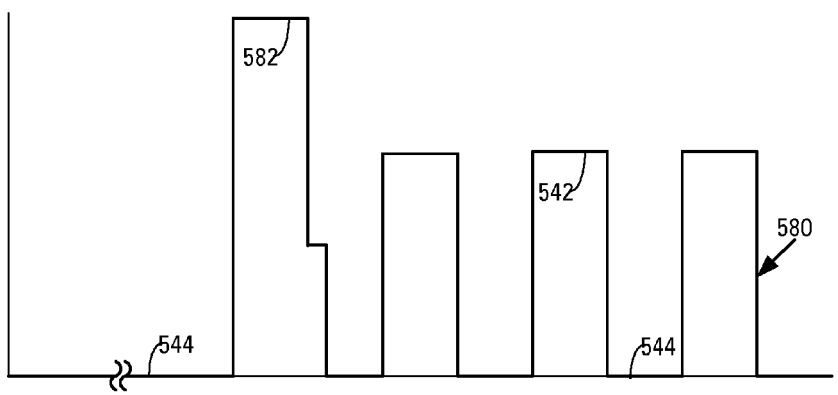
Figure 11D:
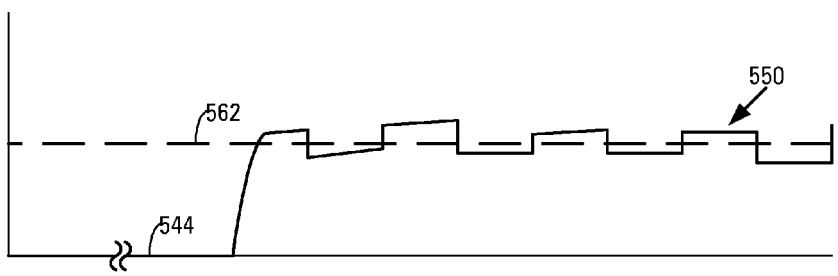

FIGS. 11A-11D are graphs illustrating the operation of an example of the data transmission method shown in FIG. 10 in which the output of the transmission line is DC coupled. The graphs show waveforms at various locations in the transmission line during and prior to imposition of a DC-balanced signal on the input of the transmission line in block 502 of an example of method 500. Also shown in FIG. 11A, and additionally applicable to FIGS. 11B-11D, are temporal region 70 in which the DC-balanced signal is imposed on the input of the transmission line and temporal region 72 prior to the DC-balanced signal being imposed on the input of the transmission line.

FIG. 11A shows waveforms at the input of the transmission line. In temporal region 70, FIG. 11A shows the waveform 540 of a DC-balanced signal imposed on the input of the transmission line in block 502 of method 500 (FIG. 10). Reference numeral 540 will also be used to refer to the DC-balanced signal itself. Similar to DC-balanced signal 40 described above with reference to FIG. 2A, DC-balanced signal 540 has a high state having a high level 542 and has a low state having a low level 544. In the example of DC-balanced signal 540 shown, to simplify the drawing, each high state is followed by a respective low state. In an actual DC-balanced signal, some of the high states are followed by one or more consecutive high states and some of the low states are followed by one or more consecutive low states. However, as described above, the temporal density of high states remains equal to the temporal density of low states during the transmission.

In temporal region 72, prior to DC-balanced signal 540 being imposed on the input of the transmission line, a static state corresponding to one of the states of DC-balanced signal 540 is imposed on the input of the transmission line. In the example shown, the static state imposed on the input of the transmission line has a level that corresponds to the level 544 of the low state of DC-balanced signal 540. Consequently, in this example, the voltage difference between the static level 544 of the input of the transmission line in temporal region 72 and the average DC level 560 of DC-balanced signal 540 is positive in polarity. In another example (not shown), the static state imposed on the input of the transmission line has a level that corresponds to the level 542 of the high state of DC-balanced signal 540 and has a level corresponding to the high level 544 of DC-balanced signal 540. Consequently, in this example, the voltage difference between the static level 542 of the input of the transmission line in temporal region 72 and the average DC level 560 of DC-balanced signal 540 is negative in polarity.

FIG. 11B shows the waveform 570 of the compensating pulse imposed on the input of the transmission line in block 504. Reference numeral 570 will also be used to refer to the compensating pulse itself. Compensating pulse 570 is imposed on the input of the transmission line concurrently with the beginning of temporal region 70, i.e., the rising edge of compensating pulse 570 is imposed on the input of the transmission line concurrently with the first rising edge of the DC-balanced signal 540 being imposed on the input of the transmission line. In an embodiment, the rising edge of compensating pulse 570 is imposed on the input of the transmission line simultaneously with the imposition of the first rising edge of DC-balanced signal 540. In other embodiments, imposition of the rising edge of compensating pulse 570 on the input of the transmission line leads or lags imposition of the first rising edge of DC-balanced signal 540 by a fraction of the bit period of DC-balanced signal 540. In an example, the fraction is no more than one quarter of the bit period.

The height and duration of compensating pulse 570 are designed to ensure that, when the DC-balanced signal begins with a high state, the first high state of the DC-balanced signal is output from the transmission line at a level greater than the threshold level of the receiver but is not so high that the first low state of the DC-balanced signal is output from the transmission line at a level greater than the threshold level. The height and duration of compensating pulse 570 are also designed to ensure that, when the DC-balanced signal begins with a low state, the first low state of the DC-balanced signal is output from the transmission line at a level less than the threshold level of the receiver but is not so low that the first high state of the DC-balanced signal is output from the transmission line at a level less than the threshold level. The levels at the output of the transmission line depend on the attenuation of the DC-balanced signal and the attenuation of the compensating pulse by transmission via the transmission line. Hence, the design height of the compensating pulse also depends on the attenuation of the compensating pulse by transmission via the transmission line. In the example shown in FIGS. 11A-11D, the voltage difference between the static level of the input of the transmission line in temporal region 72 and the average level of DC-balanced signal 540 is positive in polarity. Consequently, compensating pulse 570 is positive in polarity, i.e., level 572 is at a voltage higher than level 574.

FIG. 11C shows the waveform 580 of a combined signal at the input of the transmission line. Reference numeral 580 will also be used to refer to the combined signal itself. In this example, compensating pulse 570 has a duration equal to one bit period of DC-balanced signal 540. Combined signal 580 is a superposition of DC-balanced signal 540 and compensating pulse 570. Thus, in temporal region 70, combined signal 580 has a static level equal to the low level 544 of DC-balanced signal 540. Then, at the start of temporal region 72, combined signal 580 has a high level 582 greater than the high level 542 of DC-balanced signal 540 by the height of compensating pulse 570. At the end of the first bit period of DC-balanced signal 540, coincident with the end of compensating pulse 570, the level of combined signal 580 falls to that of DC-balanced signal 540, i.e., low level 544. After the end of compensating pulse 570, the levels of combined signal 580 are the levels 542 and 544 of DC-balanced signal 540 until the end of the transmission of DC-balanced signal 540.

In another example (not shown) in which DC-balanced signal 540 begins with a low level and compensating pulse 570 has a duration equal to one bit period of DC-balanced signal 540, combined signal 580 begins with a low level greater than the low level 544 of DC-balanced signal 540 by the height of compensating pulse 570. After the first bit period of DC-balanced signal 540, coincident with the end of compensating pulse 570, the level of the combined signal 580 rises to the high level 542 of DC-balanced signal 540 at the end of compensating pulse 570. After the end of compensating pulse 570, the levels of combined signal 580 are the levels 542 and 544 of DC-balanced signal 540 until the end of the transmission of DC-balanced signal 540.

FIG. 11D shows the waveform 550 of the transmission line output signal output by the transmission line. Reference numeral 550 will also be used to refer to the transmission line output signal itself. In this example, transmission line output signal 550 is also the input signal of the receiver and the receiver has a threshold level nominally equal to the average DC level of transmission line output signal 550. Broken line 562 indicates the average DC level of transmission line output signal 550. Reference numeral 562 will additionally be used to indicate the reference level of the receiver. In temporal region 72, transmission line output signal 550 has a static level substantially equal to the low level 544 of DC-balanced signal 540. This level is well below the threshold level 562 of the receiver.

In temporal region 70, combined signal 580 composed of DC-balanced signal 540 and compensating pulse 570 is imposed on the input of the transmission line, as shown in FIG. 11C. The transmission line transmits the combined signal to the receiver, where the compensating pulse increases the level at the output of the transmission line to a level approximately equal to the average DC level of the DC-balanced signal 540 within the first bit period of DC-balanced signal 540. Consequently, the receiver correctly determines the logical states represented by the high and low levels of transmission line output signal 550, and no data is lost. When the levels of combined signal 580 revert to those of DC-balanced signal 540 at the end of compensating pulse 570, the high levels and low levels of DC-balanced signal 540 respectively continue to be greater than and less than threshold level 562. Thus, after the end of compensating pulse 570, the receiver continues to correctly determine the logical states represented by the high and low levels of transmission line output signal 550, and no data is lost.

In the above-described example in which a static level corresponding to the high level 542 of DC-balanced signal 540 is imposed on the input of the transmission line in temporal region 72, such high level charges the transmission line to a level greater than the average DC level of the DC-balanced signal 540. In such example, the voltage difference between the static level of the input of the transmission line in temporal region 72 and the average level of DC-balanced signal 540 is negative in polarity. Consequently, in this example, compensating pulse 570 is negative in polarity, i.e., level 572 is at a negative voltage relative to level 574. Within the first bit period of DC-balanced signal 540, the negative-going compensating pulse additionally imposed on the input of the transmission line and transmitted by the transmission line rapidly discharges the transmission line until the DC component of the voltage on the transmission line output corresponds to the average DC level of DC-balanced signal 540.

FIGS. 12A-12E are graphs illustrating the operation of an example of the data transmission method shown in FIG. 10 in which the output of the transmission line is ac coupled. The graphs show waveforms at various locations in the transmission line during and prior to imposition of a DC-balanced signal on the input of the transmission line in block 502 of an example of method 500. Also shown in FIG. 12A, and additionally applicable to FIGS. 12B-12E, are temporal region 70 in which the DC-balanced signal is imposed on the input of the transmission line and temporal region 72 prior to the DC-balanced signal being imposed on the input of the transmission line.

Figure 12A:
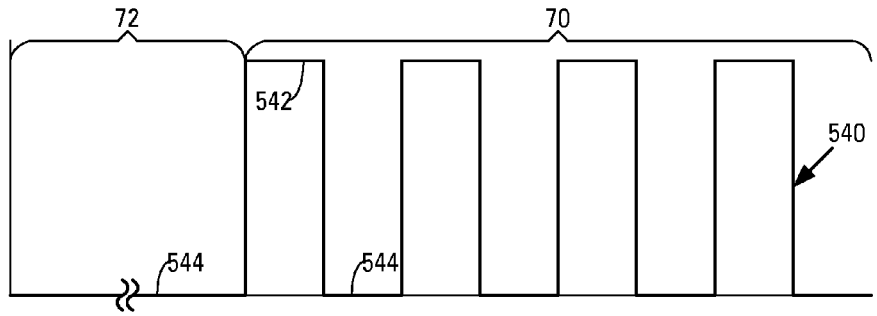
FIGS. 12A-12E are graphs illustrating the operation of an example of the data transmission method shown in FIG. 10 in which the output of the transmission line is ac coupled.

FIG. 12A shows waveforms at the input of the transmission line. FIG. 12A is identical to FIG. 11A and will therefore not be described again here.

Figure 12B:

FIG. 12B shows the waveform 571 of the compensating pulse imposed on the input of the transmission line in block 504. Reference numeral 571 will also be used to refer to the compensating pulse itself. Compensating pulse 571 is imposed on the input of the transmission line concurrently with the beginning of temporal region 70, i.e., the rising edge of compensating pulse 571 is imposed on the input of the transmission line concurrently with the first rising edge of the DC-balanced signal 540 being imposed on the input of the transmission line. In an embodiment, the rising edge of compensating pulse 571 is imposed on the input of the transmission line simultaneously with the imposition of the first rising edge of DC-balanced signal 540. In other embodiments, imposition of the rising edge of compensating pulse 571 on the input of the transmission line leads or lags imposition of the first rising edge of DC-balanced signal 540 by a fraction of the bit period of DC-balanced signal 540. In an example, the fraction is no more than one quarter of the bit period.

The height and duration of compensating pulse 571 are designed to ensure that, when the DC-balanced signal begins with a low state, the first low state of the DC-balanced signal is output from the transmission line and coupled to the input of the receiver at a level less than the threshold level of the receiver but is not so low that the first high state of the DC-balanced signal is output from the transmission line and coupled to the input of the receiver at a level less than the threshold level. The height and duration of compensating pulse 570 are also designed to ensure that, when the DC-balanced signal begins with a high state, the first high state of the DC-balanced signal is output from the transmission line and coupled to the input of the receiver at a level greater than the threshold level of the receiver but is not so high that the first low state of the DC-balanced signal is output from the transmission line and coupled to the input of the receiver at a level greater than the threshold level. The levels at the output of the transmission line depend on the attenuation of the DC-balanced signal and the attenuation of the compensating pulse by transmission via the transmission line. Hence, the design height of the compensating pulse also depends on the attenuation of the compensating pulse by transmission via the transmission line. In the example shown in FIGS. 12A-12E, the voltage difference between the static level of the input of the transmission line in temporal region 72 and the average level of DC-balanced signal 540 is positive in polarity. Consequently, compensating pulse 571 is negative in polarity, i.e., level 573 is at a voltage lower than level 575.

Figure 12C:
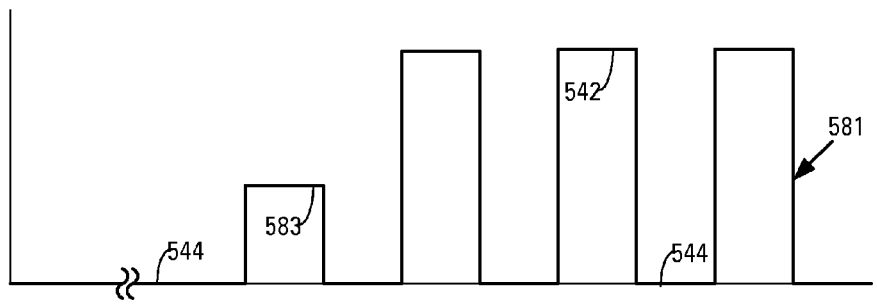

FIG. 12C shows the waveform 581 of a combined signal at the input of the transmission line. Reference numeral 581 will also be used to refer to the combined signal itself. In this example, compensating pulse 571 has a duration equal to one bit period of DC-balanced signal 540. Combined signal 581 is a superposition of DC-balanced signal 540 and compensating pulse 571. Thus, in temporal region 70, combined signal 581 has a static level equal to the low level 544 of DC-balanced signal 540. Then, at the start of temporal region 72, combined signal 581 has a high level 583 less than the high level 542 of DC-balanced signal 540 by the height of compensating pulse 571. At the end of the first bit period of DC-balanced signal 540, coincident with the end of compensating pulse 571, the level of combined signal 581 falls to the low level of DC-balanced signal 540. After the end of compensating pulse 571, the levels of combined signal 581 are the levels 542 and 544 of DC-balanced signal 540 until the end of the transmission of DC-balanced signal 540.

In another example (not shown) in which DC-balanced signal 540 begins with a low level and compensating pulse 571 has a duration equal to one bit period of DC-balanced signal 540, combined signal 581 begins with a low level less than the low level 544 of DC-balanced signal 540 by the height of compensating pulse 571. After the first bit period of DC-balanced signal 540, and coincident with the end of compensating pulse 571, the level of the combined signal 581 rises to a level equal to the high level 542 of DC-balanced signal 540. After the end of compensating pulse 571, the levels of combined signal 581 are the levels 542 and 544 of DC-balanced signal 540 until the end of the transmission of DC-balanced signal 540.

Figure 12D:
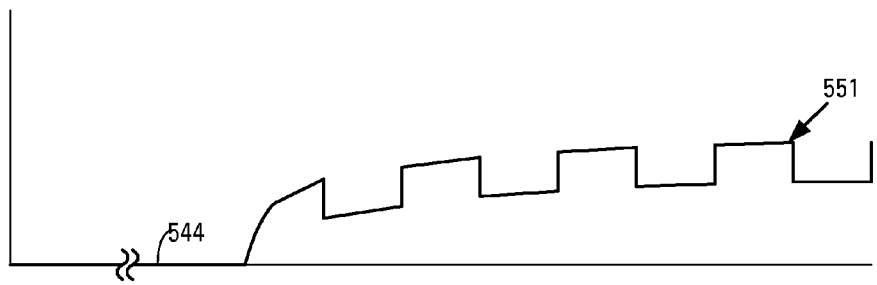

FIG. 12D shows the waveform 551 of the transmission line output signal output by the transmission line. Reference numeral 551 will also be used to refer to the transmission line output signal itself. In temporal region 72, transmission line output signal 551 has a constant DC level substantially equal to the low level 544 of DC-balanced signal 540. As described above, the low level of transmission line output signal 551 discharges the capacitor that couples the output of the transmission line to the receiver.

In temporal region 70, combined signal 581 composed of DC-balanced signal 540 and compensating pulse 571 is imposed on the input of the transmission line, as shown in FIG. 12C. The transmission line transmits the combined signal to the receiver, where the compensating pulse reduces the height of the initial rising edge of transmission line output signal 551. Afterwards, the average DC level of transmission line output signal 551 gradually rises to that of DC-balanced signal 540 as the transmission line charges up.

Figure 12E:
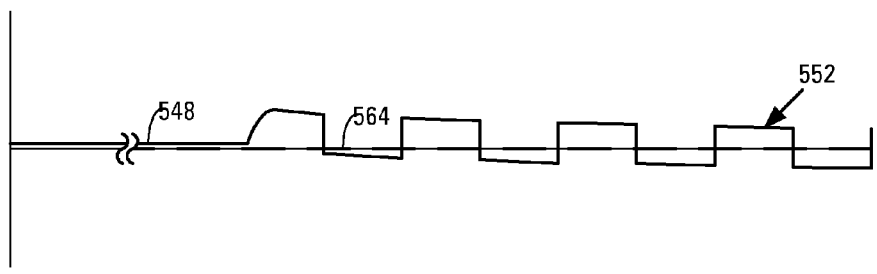

FIG. 12E shows waveforms at the input of the receiver to which the output of the transmission line is ac coupled. In temporal region 72, the input of the receiver is held at a DC level 548 that differs from the threshold level 564 of the receiver in a manner similar to that described above with reference to FIG. 5C. In temporal region 70, the initial rising edge of transmission line output signal 551 is ac coupled to the input of the receiver but does not raise the level at the input of the receiver to one that prevents the first low state of transmission line output signal 551 falling below threshold level 564. Consequently, the receiver correctly determines the logical states represented by the high and low levels of receiver input signal 552, and no data is lost. When the levels of combined signal 581 revert to those of DC-balanced signal 540 at the end of compensating pulse 571, the high levels and low levels of receiver input signal 552 respectively continue to be greater than and less than threshold level 564 as the average DC level of the receiver input signal falls towards threshold level 564 as the transmission line and the coupling capacitor charge up. Thus, after the end of compensating pulse 571, the receiver continues to correctly determine the logical states represented by the high and low levels of receiver input signal 552, and no data is lost.

In the above-described example in which a static level corresponding to the high level 542 of DC-balanced signal 540 is imposed on the input of the transmission line in temporal region 72, such high level charges the transmission line and the coupling capacitor that couples the output of the transmission line to the receiver to a level greater than the average DC level of the DC-balanced signal 540. In such example, the voltage difference between the static level of the input of the transmission line in temporal region 72 and the average level of DC-balanced signal 540 is negative in polarity. Consequently, compensating pulse 571 is positive in polarity, i.e., level 573 is at a more positive voltage than level 575. Within the first bit period of DC-balanced signal 540, the positive-going compensating pulse additionally imposed on the input of the transmission line and transmitted by the transmission line reduces the amplitude of the initial negative-going transient on the output of the transmission line, which prevents such transient coupled to the input of the receiver from changing the DC level at the input of the receiver to one at which the high levels of the DC-balanced signal fail to exceed the threshold level 564 of the input of the receiver.

Figure 13A:
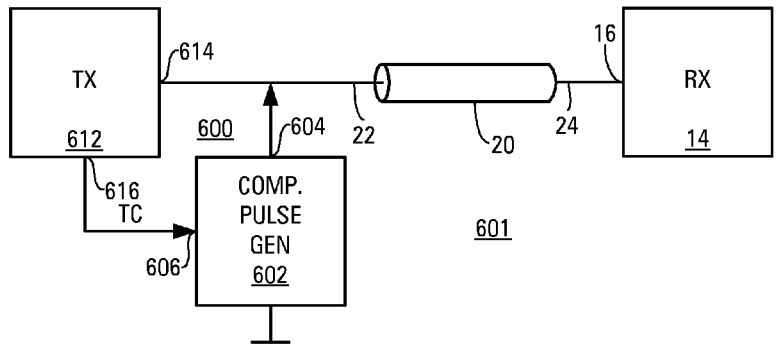
FIGS. 13A and 13B are block diagrams respectively showing a DC-coupled example and an ac-coupled example of a system in accordance with another embodiment of the invention for transmitting a DC-balanced signal via a transmission line.
Figure 13B:
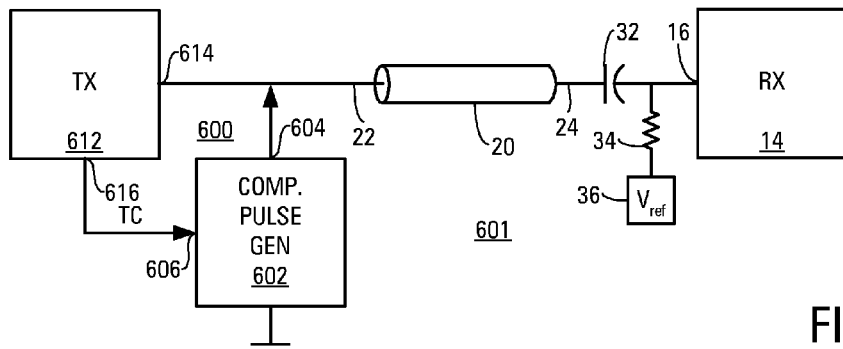

FIGS. 13A and 13B are block diagrams showing examples of a system 600 in accordance with another embodiment with the invention for transmitting a DC-balanced signal to a receiver via a transmission line. The output 24 of transmission line 20 is electrically coupled to the input 16 of receiver 14. In the example shown in FIG. 13A, the output 24 of transmission line 20 is DC coupled to the input 16 of receiver 14. In the example shown in FIG. 13B, the output 24 of transmission line 20 is ac coupled to the input 16 of receiver 14 by capacitor 32 and input 16 is biased by resistor 34 connected to voltage source 36. Receiver 14, transmission line 20, input 22, output 24, capacitor 32 and resistor 34 are described above with reference to FIGS. 1A and 1B, and will not be described again in detail here.

System 600 is composed of a transmitter 612 and a compensating pulse generator 602. Transmitter 612 is operable to impose the DC-balanced signal on the input 22 of transmission line 20. The DC-balanced signal has a high state and a low state each having a respective DC level. The compensating pulse generator is operable when transmitter 612 starts to impose the DC-balanced signal on the input 22 of transmission line 20 to additionally impose a compensating pulse on the input of the transmission line. As described above, additionally imposing a compensating pulse on the input 22 of transmission line 20 when transmitter 612 starts to impose the DC-balanced signal on the input of the transmission line prevents data loss at the beginning of the transmission.

In the example shown in FIG. 13A, in which the output 24 of transmission line 20 is DC coupled to the input 16 of receiver 14, the compensating pulse imposed by compensating pulse generator 602 on the input 22 of transmission line 20 has the same polarity as the voltage difference between the static level at which transmitter 612 holds the input of transmission line 20 prior to imposing the DC-balanced signal thereon and the average DC level of the DC-balanced signal. In the example shown in FIG. 13B, in which the output 24 of transmission line 20 is ac coupled to the input 16 of receiver 14, the compensating pulse imposed by compensating pulse generator 602 on the input 22 of transmission line 20 is opposite in polarity to the voltage difference between the static level at which transmitter 612 holds the input of transmission line 20 prior to imposing the DC-balanced signal thereon and the average DC level of the DC-balanced signal.

In the examples shown in FIGS. 13A and 13B, compensating pulse generator 602 has an output 604 and a control input 606, and transmitter 612 has a signal output 614 and a transmit control output 616. The output 604 of compensating pulse generator 602 is electrically connected to the input 22 of transmission line 20. Compensating pulse generator 602 imposes the compensating pulse on the input 22 of transmission line 20 via output 604. The transmit control output 614 of transmitter 612 is electrically connected to the control input 606 of compensating pulse generator 602. Transmitter 612 generates a transmit control signal TC that it outputs at transmit control output 616. Transmit control signal TC changes state when transmitter 612 starts imposing the DC-balanced signal on the input 22 of transmission line 20, and reverts to its original state with transmitter 612 stops imposing the DC-balanced signal on the input 22 of transmission line 20. In response to each change in state of transmit control signal TC indicating that the transmitter has started to impose the DC-balanced signal on the input 22 of transmission line 20, compensating pulse generator 602 imposes a compensating pulse on the input 22 of transmission line 20. The polarity of the compensating pulse depends on the coupling mode between the output of the transmission line and the input of the receiver and on whether the static level at which transmitter 612 holds the input 22 of transmission line 20 prior to imposing the DC-balanced signal thereon corresponds to the high level or the low level of the DC-balanced signal, as described above. Compensating pulse generator 602 additionally imposing the compensating pulse on the input 22 of transmission line 20 prevents the loss of data at the start of transmission of the DC-balanced signal by transmitter 612.

Conventional transmitters suitable for use as transmitter 612 typically generate a transmission start signal whose state changes at the beginning and end of each transmission. In some embodiments of system 600, such transmission start signal is used as the above-mentioned transmit control signal TC. In other embodiments, transmit control signal TC is generated in response to the transmission start signal.

FIGS. 13A and 13B additionally show examples of a data transmission system 601 in accordance with an embodiment with the invention. System 601 is composed of transmitter 612, compensating pulse generator 602, receiver 14 and transmission line 20, all as described above. In the example shown in FIG. 13A, the output 24 of transmission line 20 is DC coupled to the input 16 of receiver 14. In the example shown in FIG. 13B, the output 24 of transmission line 20 is ac coupled to the input 16 of receiver 14 by coupling capacitor 32, and resistor 34 connected to voltage source 36 biases input 16 to a level that differs from the threshold level of the receiver, in a manner similar to that described above with reference to FIG. 5C.

Figure 14:
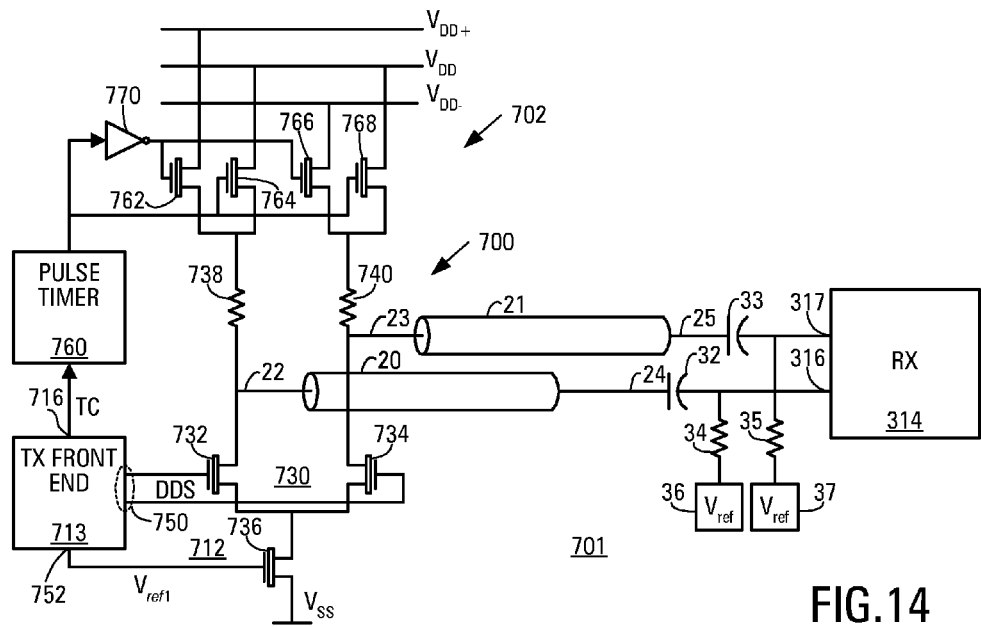
FIG. 14 is a schematic diagram showing an example of a system in accordance with an embodiment of the invention for transmitting a DC-balanced signal via a transmission line in which the compensating pulse generator modifies the operation of the output stage of the transmitter.

FIG. 14 is a schematic diagram showing an example of a system 700 in accordance with an embodiment of the invention for transmitting a DC-balanced signal via a transmission line. In this example, the compensating pulse generator constitutes part of the output stage of the transmitter. FIG. 13 shows a transmitter 712 that transmits a DC-balanced signal to receiver 314. Transmitter 712 and receiver 314 are differential devices coupled via transmission lines 20, 21. The output 24 of transmission line 20 is coupled to the input 316 receiver 314 by capacitor 32, and input 316 is biased by resistor 34 connected to voltage source 36. The output 25 of transmission line 21 is coupled to the input 317 of receiver 314 by capacitor 33, and input 317 is biased by resistor 35 connected to voltage source 37. Transmitter 712 is composed of a transmitter front end 713 and output circuit 730. Transmitter front end 713 is conventional and is therefore shown as a block to simplify the drawing. Transmitter front end 713 has a signal input (not shown), a differential drive signal output 750, a reference voltage output 752 and a transmit control output 716.

Output stage 730 is similar in structure to output stage 330 described above with reference to FIG. 8 and will not be described again in detail here. However, in output stage 730, load resistors 738 and 740 are connected to a compensating pulse generator 702, as will be described in more detail below.

In system 700, compensating pulse generator 702 is composed of a pulse timer 760, transistors 762, 764, 766 and 768 and an inverter 770. In the example of system 700 shown in FIG. 14, in temporal region 72 (FIG. 12A), the static differential drive signal output at differential drive signal output 750 turns transistor 732 OFF and transistor 734 ON. Thus, in this example of system 750, in temporal region 72, transmitter 712 imposes a high level on the input 22 of transmission line 20 and a low level on the input 23 of transmission line 21.

In compensating pulse generator 702, transistor 762 is connected in series between supply rail $V_{DD+}$ and the end of load resistor 738 remote from the input 22 of transmission line 20; transistor 764 is connected in series between supply rail $V_{DD}$ and the end of load resistor 738 remote from the input 22 of transmission line 20; transistor 766 is connected in series between supply rail $V_{DD-}$ and the end of load resistor 740 remote from the input 23 of transmission line 21; and transistor 768 is connected in series between supply rail $V_{DD}$ and the end of load resistor 740 remote from the input 23 of transmission line 21. The voltage on supply rail $V_{DD+}$ is greater than that on supply rail $V_{DD}$ by a voltage difference that determines the height of the compensating pulse imposed on the input of transmission line 20 and the voltage on supply rail $V_{DD-}$ is less than that on supply rail $V_{DD}$ by a voltage difference that determines the height of the compensating pulse imposed on the input of transmission line 21. The gates of transistors 764 and 768 are connected to the output of pulse timer 760. The gates of transistors 762 and 766 are connected to the output of inverter 770 whose input is connected to the output of pulse timer 760. The input of pulse timer 760 is connected to the transmit control output 716 of transmitter front end 713.

Referring additionally to FIG. 12A, in temporal region 72, the static differential drive signal output at differential drive signal output 750 causes transmitter 712 to impose a high level on the input 22 of transmission line 20 and a low level on the input 23 of transmission line 21. Additionally, the output of pulse timer 760 is in a state that holds transistors 764 and 768 ON and that, when inverted by inverter 770, holds transistors 762 and 766 OFF. Consequently, transistors 764 and 768 connect load resistors 738 and 740, respectively, to supply rail $V_{DD}$.

At the beginning of temporal region 70, the differential drive signal output 750 of transmitter front end 713 starts to supply a dynamic differential drive signal DDS to the gates of transistors 732 and 734. The dynamic differential drive signal represents a DC-balanced signal. In response to the dynamic differential DC-balanced drive signal, transistors 732 and 734 alternately steer current received from load resistors 738 and 740, respectively, to current sink transistor 736. As a result, output stage 730 imposes antiphase components of the DC-balanced signal on the inputs of transmission lines 20 and 21. Additionally, at the beginning of temporal region 70, the transmit control signal TC output at the transmit control output 716 of transmitter front end 713 changes state. The change in state of transmit control signal TC causes the output of pulse timer 760 to change state for a predetermined time determined by the pulse timer. In its changed state, the output of pulse timer 760 turns transistors 764 and 768 OFF and, inverted by inverter 770, turns transistors 762 and 766 ON. In their ON states, transistors 762 and 766 respectively connect load resistor 738 to supply rail $V_{DD+}$ and load resistor 740 to supply rail $V_{DD-}$. This imposes on the input 22 of transmission line 20 a positive-going voltage step that constitutes the beginning of the compensating pulse, and imposes on the input 23 of transmission line 21 a negative-going voltage step that constitutes the beginning of the compensating pulse.

After the predetermined time of pulse timer 760 has elapsed, the output of pulse timer 760 reverts to its original state. The output of pulse timer 760 reverting to its original state causes transistors 762, 764, 766 and 768 to revert to their original states and restores the connections between load resistors 738 and 740 and supply rail $V_{DD}$. This imposes on the input 22 of transmission line 20 a negative-going voltage step that constitutes the end of the compensating pulse, and imposes on the input 23 of transmission line 21 a positive-going voltage step that constitutes the end of the compensating pulse. Transmission lines 20 and 21 convey the antiphase components of the DC-balanced signal and the respective compensating pulses to receiver 314 in a manner similar to that described above with reference to FIGS. 12A-12E. When transmitted to the receiver via transmission lines 20, 21 and capacitors 32 and 33, the compensating pulses imposed on the inputs of the transmission lines prevent data loss at the receiver at the beginning of temporal region 70.

In another example of system 700, the outputs 24 and 25 of transmission lines 20 and 21 are DC coupled to the inputs 316 and 317 of receiver 314 in a manner similar to that described above with reference to FIG. 13A. In such example, the drain of transistor 762 is connected to supply rail $V_{DD-}$ and the drain of transistor 766 is connected to supply rail $V_{DD+}$ to provide the necessary reversal of the polarity of the compensation pulses. Additionally, this example may need different values of the voltage difference between supply rails $V_{DD+}$ and $V_{DD}$ and the voltage difference between supply rails $V_{DD-}$ and $V_{DD}$.

FIG. 14 additionally shows an example of a data transmission system 701 in accordance with an embodiment with the invention. System 701 is composed of transmitter 712, compensating pulse generator 702, pulse timer 760, receiver 314, transmission line 20 and transmission line 21, all as described above. In the example shown, the output 24 of transmission line 20 is ac coupled to the input 316 of receiver 314 by capacitor 32 and input 316 is biased by resistor 34 connected to voltage source 36. Additionally, the output 25 of transmission line 21 is ac coupled to the input 317 of receiver 314 by capacitor 33 and input 317 is biased by resistor 35 connected to voltage source 37. Alternatively, the outputs 24 and 25 of transmission lines 20 and 21, respectively, are DC coupled to the inputs 316 and 317, respectively, of receiver 314 in a manner similar to that described above with reference to FIG. 6A.

This disclosure describes the invention in detail using illustrative embodiments. However, the invention defined by the appended claims is not limited to the precise embodiments described.

I claim:

1. A system for transmitting a DC-balanced signal to a receiver via a transmission line having an input and an output, the output of the transmission line electrically coupled to the receiver, the system comprising:
   a transmitter having an output stage comprising differentially-connected transistors and respective load resistors, wherein the transmission line is connected to a node between one of the transistors and its respective load resistor, the transmitter operable to impose the DC-balanced signal on the input of the transmission line, the DC-balanced signal having a high state and a low state, each having a respective DC level; and
   means, operable prior to the transmitter imposing the DC-balanced signal on the input of the transmission line, for holding the input of the transmission line at an intermediate DC level, the intermediate DC level intermediate between the DC levels of the high state and the low state of the DC-balanced signal, and the intermediate DC level not equal to zero volts, the means for holding having a switch operable to connect the load resistors in parallel.

2. The system of claim 1, in which: A system for transmitting a DC-balanced signal to a receiver via a transmission line having an input and an output, the output of the transmission line electrically coupled to the receiver, the system comprising:
- a transmitter comprises having an output stage comprising first differentially-connected transistors and respective load resistors and a first current sink connected to the first differentially-connected transistors; and
- means, operable prior to the transmitter imposing the DC-balanced signal on the input of the transmission line, for holding the input of the transmission line at an intermediate DC level, the intermediate DC level intermediate between the DC levels of the high state and the low state of the DC-balanced signal, and the intermediate DC level not equal to zero volts;
- wherein the transmission line is connected to a node between one of the first transistors and its respective load resistor; and
- wherein the means for holding comprises:
- second differentially-connected transistors connected to the load resistors,
- a second current sink connected to the second differentially-connected transistors, and switches connected to deactivate the first current sink prior to the transmitter imposing the DC-balanced signal on the input of the transmission line, and to deactivate the second current sink in antiphase while the transmitter imposes the DC-balanced signal on the input of the transmission line.

3. A data transmission system, comprising:
- the system comprising the transmitter and the means for holding, as claimed in claim 1;
- the transmission line on which the transmitter imposes the DC-balanced signal; and
- the receiver comprising an input coupled to the output of the transmission line.

4. The data transmission system of claim 3, additionally comprising:
- a coupling capacitor connected between the output of the transmission line and the input of the receiver; and
- a biasing circuit connected to the input of the receiver.

5. A method for transmitting a DC-balanced signal via a transmission line having an input and an output, the method comprising:
- imposing the DC-balanced signal on the input of the transmission line, the imposing changing an average DC level at the output of the transmission line; and
- at the start of the imposing, additionally imposing a compensating pulse on the input of the transmission line, the compensating pulse compensating for the change in the average DC level at the output of the transmission line caused by the imposing.

6. The method of claim 5, in which:
- the output of the transmission line is DC coupled; and
- the compensating pulse has the same polarity as a voltage difference between a static level of the input of the transmission line prior to the imposing of the DC-balanced signal thereon and the average DC level of the DC-balanced signal.

7. The method of claim 5, in which:
- the output of the transmission line is ac coupled; and
- the compensating pulse is opposite in polarity to a voltage difference between a static level of the input of the transmission line prior to the imposing of the DC-balanced signal thereon and the average DC level of the DC-balanced signal.

8. A system for transmitting a DC-balanced signal to a receiver via a transmission line having an input and an output, the output of the transmission line electrically coupled to the receiver, the system comprising:
- a transmitter operable to impose the DC-balanced signal on the input of the transmission line; and
- a compensating pulse generator operable at the beginning of the transmitter imposing the DC-balanced signal on the input of the transmission line to additionally impose a compensation pulse on the input of the transmission line, the compensating pulse compensating for a change in DC level at the output of the transmission line caused by the transmitter imposing the DC-balanced signal on the input of the transmission line.

9. The system of claim 8, in which:
- the output of the transmission line is DC coupled; and
- the compensating pulse generator is operable to generate the compensating pulse with the same polarity as a voltage difference between a static level of the input of the transmission line prior to the imposing of the DC-balanced signal thereon and an average DC level of the DC-balanced signal.

10. The system of claim 8, in which:
- the output of the transmission line is ac coupled; and
- the compensating pulse generator is operable to generate the compensating pulse opposite in polarity to a voltage difference between a static level of the input of the transmission line prior to the imposing of the DC-balanced signal thereon and an average DC level of the DC-balanced signal.

11. The system of claim 8, in which:
- the transmitter comprises an output stage comprising first differentially-connected transistors and respective load resistors and a first current sink connected thereto;
- the transmission line is connected to a node between one of the first transistors and its respective load resistor; and
- the compensating pulse generator comprises switches operable to connect the load resistors to first supply voltages prior to the transmitter imposing the DC-balanced signal on the input of the transmission line and additionally operable at the start of the transmitter imposing the DC-balanced signal on the input of the transmission line to connect the load resistors to second supply voltages, at least one of the second supply voltages differing from at least one of the first supply voltages.

12. The system of claim 8, in which:
- the transmitter comprises an output stage coupled to the transmission line; and
- the compensating pulse generator is operable at the start of the transmitter imposing the DC-balanced signal on the input of the transmission line to cause the output stage of the transmitter additionally to impose the compensating pulse on the input of the transmission line.

13. A data transmission system, comprising:
- the system comprising the transmitter and the compensating pulse generator, as claimed in claim 8;
- the transmission line on which the transmitter imposes the DC-balanced signal; and
- the receiver comprising an input coupled to the output of the transmission line.

14. The data transmission system of claim 13, additionally comprising:
- a capacitor connected between the output of the transmission line and the input of the receiver; and
- a biasing circuit connected to the input of the receiver.

* * * * *